(12) United States Patent
Sugiyama

(10) Patent No.: US 12,541,142 B2
(45) Date of Patent: Feb. 3, 2026

(54) LIGHT SOURCE DEVICE AND PROJECTION DEVICE

(71) Applicant: CASIO COMPUTER CO., LTD., Tokyo (JP)

(72) Inventor: Chihaya Sugiyama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 331 days.

(21) Appl. No.: 18/121,845

(22) Filed: Mar. 15, 2023

(65) Prior Publication Data

US 2023/0296973 A1 Sep. 21, 2023

(30) Foreign Application Priority Data

Mar. 16, 2022 (JP) ................................. 2022-041130

(51) Int. Cl.
*G03B 21/20* (2006.01)

(52) U.S. Cl.
CPC ....... *G03B 21/204* (2013.01); *G03B 21/2066* (2013.01); *G03B 21/2073* (2013.01)

(58) Field of Classification Search
CPC .............. G03B 21/204; G03B 21/2066; G03B 21/2073
USPC .......................................................... 353/20
See application file for complete search history.

(56) References Cited

U.S. PATENT DOCUMENTS

2018/0239233 A1* 8/2018 Kado .................. G03B 21/204

FOREIGN PATENT DOCUMENTS

| JP | 5397633 B2 | 1/2014 | |
|---|---|---|---|
| JP | 5858664 B2 | 2/2016 | |
| JP | 5987368 B2 | 9/2016 | |
| JP | 2019-174527 A | 10/2019 | |
| JP | 2020-030360 A | 2/2020 | |
| JP | 2020-071307 A | 5/2020 | |
| JP | 2020-154144 A | 9/2020 | |
| JP | 2020-154148 A | 9/2020 | |
| WO | WO-2021132061 A1 * | 7/2021 | ........... H04N 9/3173 |

OTHER PUBLICATIONS

Translation of WO_2021132061_A1 (Year: 2025).*
JPO; Application No. 2022-041130; Notice of Reasons for Refusal dated Jan. 30, 2024.

* cited by examiner

*Primary Examiner* — Jerry L Brooks
(74) *Attorney, Agent, or Firm* — Fitch, Even, Tabin & Flannery LLP

(57) ABSTRACT

A light source device includes a first polarization beam splitter and a dichroic mirror. The first polarization beam splitter has a first optical surface that separates light incident on the first optical surface into light beams having different polarization directions from each other. The dichroic mirror has a second optical surface. The second optical surface intersects the first optical surface and guides reflection light reflected by a fluorescent emitter and fluorescence in different directions from each other. The reflection light is part of incident light that has been emitted by a first light source and incident on the fluorescent emitter via the first optical surface. The fluorescence is emitted by the fluorescent emitter in response to the incident light.

16 Claims, 11 Drawing Sheets

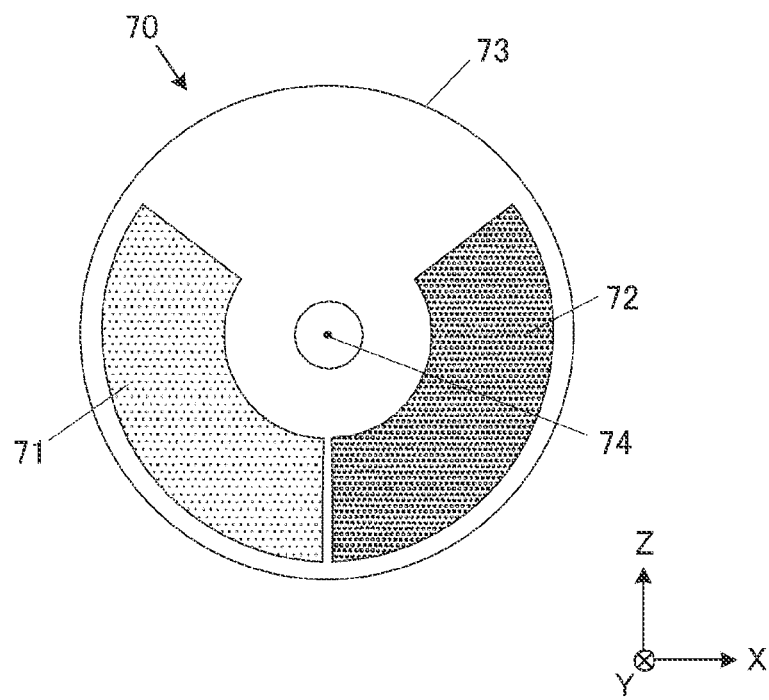

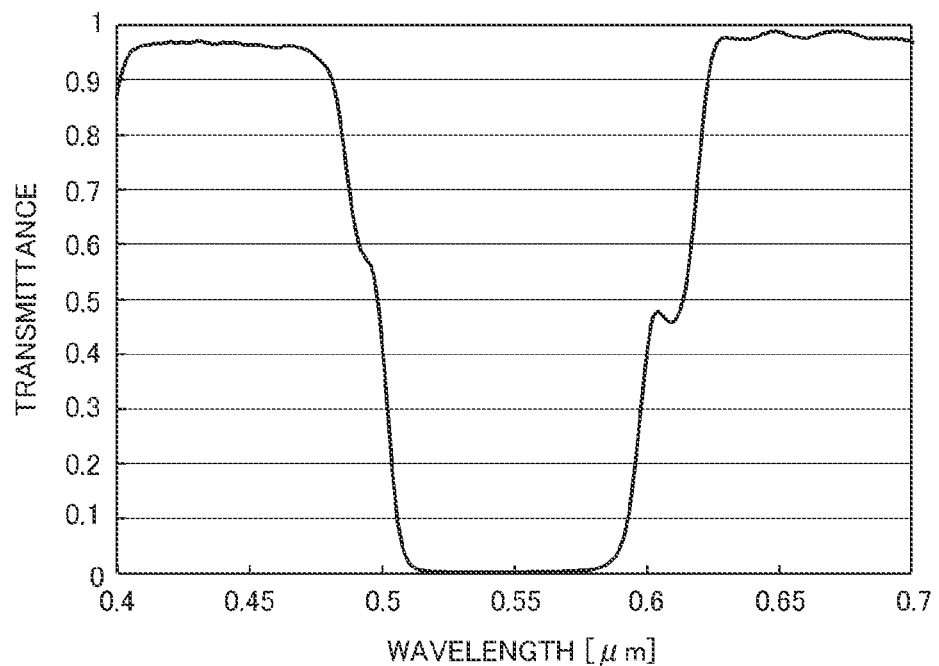

| | Fr | Fg | Fb | Fr | Fg | Fb |
|---|---|---|---|---|---|---|
| COLOR OF OUTPUT LIGHT | RED | GREEN | BLUE | RED | GREEN | BLUE | ... |
| FIRST LIGHT SOURCE 21 | ON | | | ON | | | ... |
| FIRST POLARIZATION CONVERTER 31 | OFF | ON | OFF | OFF | ON | OFF | ... |
| SECOND POLARIZATION CONVERTER 32 | ON | OFF | – | ON | OFF | – | ... |

LIGHT SOURCE DEVICE AND PROJECTION DEVICE

REFERENCE TO RELATED APPLICATIONS

This application is based upon and claims the benefit of priority from the prior Japanese Patent Application No. 2022-041130, filed on Mar. 16, 2022, the entire contents of which are incorporated herein by reference.

TECHNICAL FIELD

The present disclosure relates to a light source device and a projection device.

DESCRIPTION OF RELATED ART

Conventionally, a light source device that concentrates light emitted by a light source in an appropriate direction and outputs the light with high directivity is known. In a technology used in a light source device incorporated in a device that uses light of multiple colors that differ from each other, such as a projection device that projects a color image, a phosphor is irradiated with monochromatic excitation light emitted by a light source so that fluorescence of a color different from that of the excitation light is obtained and output. For example, in the technology disclosed in FIG. 20 of JP2020-154148A, the polarization direction of excitation light emitted by the light source is converted by a polarization conversion element, and the traveling direction of the excitation light is switched by a polarization beam splitter depending on the polarization direction, thereby setting a period when the phosphor is irradiated with the excitation light and emits fluorescence and a period when the excitation light is emitted as it is.

However, part of the excitation light incident on the phosphor is reflected on the surface of the phosphor and returns to the polarization beam splitter as randomly polarized light. Part of such reflected excitation light is reflected by the polarization beam splitter with the fluorescence. Therefore, due to mixing and blending of the fluorescence and the reflected excitation light, light of an appropriate color cannot be output.

SUMMARY OF THE INVENTION

A light source device according to an embodiment of the present invention includes:
 a first polarization beam splitter that has a first optical surface that separates light incident on the first optical surface into light beams having different polarization directions from each other; and
 a dichroic mirror that has a second optical surface, the second optical surface intersecting the first optical surface and guiding reflection light reflected by a fluorescent emitter and fluorescence in different directions from each other, the reflection light being part of incident light that has been emitted by a first light source and incident on the fluorescent emitter via the first optical surface, the fluorescence being emitted by the fluorescent emitter in response to the incident light.

A projection device according to an embodiment of the present invention includes:
 a light source device according an embodiment of the present invention; and
 an image projector that projects an image using light output by the light source device.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 5 is a diagram illustrating a configuration of a phosphor wheel;

FIG. 6 is a diagram illustrating a state of the light source device in the frame period when red light, green light, and blue light LB are each emitted;

FIG. 10 is a diagram illustrating transmission performance of a second optical surface of a dichroic mirror according to the second embodiment;

FIG. 11 is a diagram illustrating the state of the light source device of the second embodiment in the frame period when red light, green light, and blue light are each emitted;

DETAILED DESCRIPTION

Hereinafter, embodiments of the present disclosure will be described with reference to the drawings.

First Embodiment

<Summary of Configuration of Projector>

Figure 1:
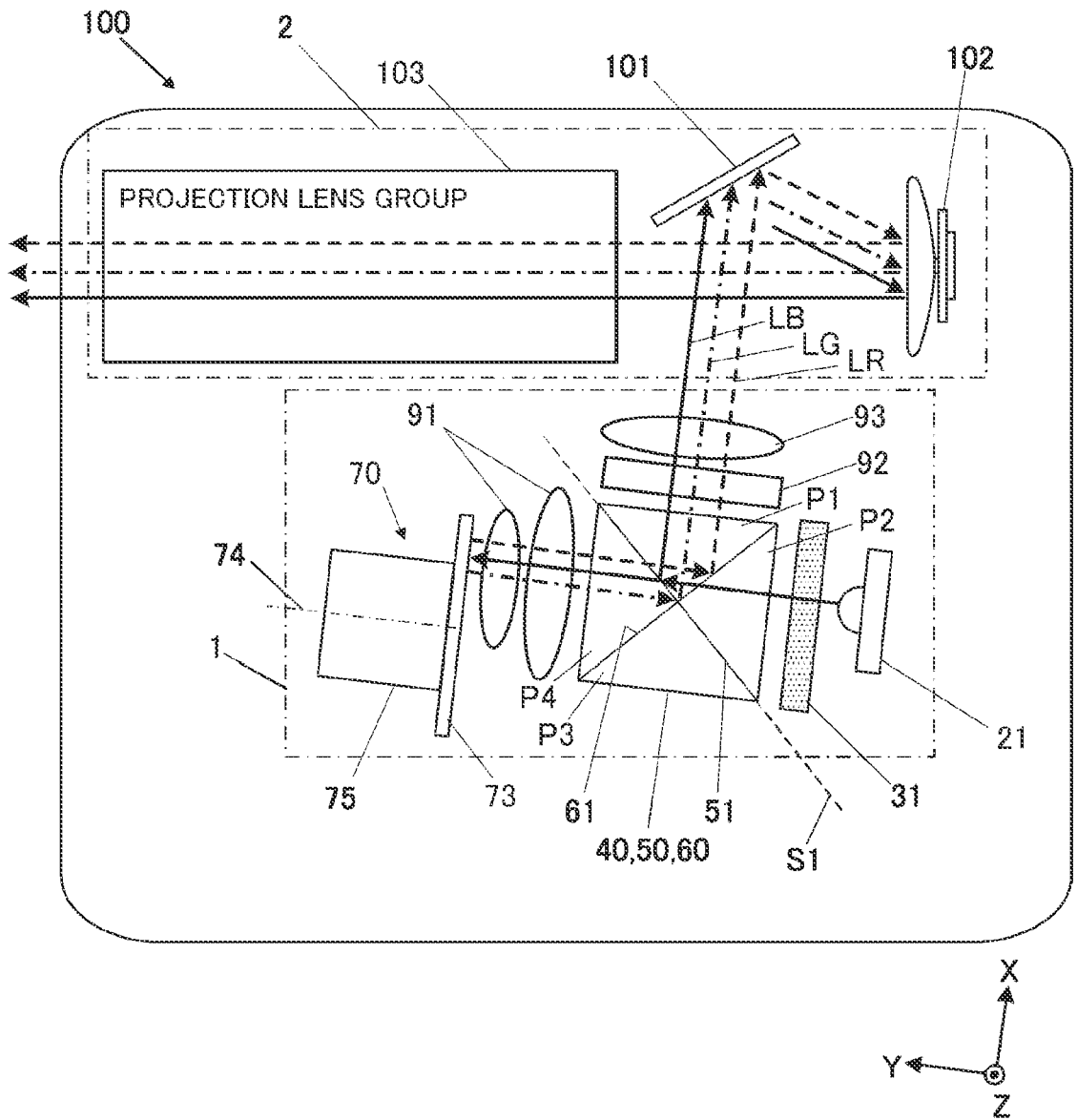
FIG. 1 is a schematic diagram of a projector having a light source device according to an embodiment.

FIG. 1 is a schematic diagram illustrating a configuration of a projector 100 having a light source device 1 according to the first embodiment.

The projector 100 (projection device) has a light source device 1 and an image projector 2 that projects an image using light output by the light source device 1. The light source device 1 outputs light of a blue wavelength range (first light: hereinafter referred to as "blue light LB"), light of a green wavelength range (second light: hereinafter referred to as "green light LG"), and light of a red wavelength range (third light: hereinafter referred to as "red light LR") to the image projector 2. The image projector 2 uses the blue light LB, green light LG, and red light LR to project a color image onto a projection surface.

The above blue wavelength range corresponds to a "first wavelength range." The green wavelength range corresponds to a "second wavelength range." The red wavelength range corresponds to a "third wavelength range." The green wavelength range is different from the blue wavelength range. The red wavelength range is different from the blue wavelength range. The red wavelength range is also different from the green wavelength range. Here, two wavelength ranges that are different from each other means that at least a part of the two wavelength ranges do not overlap each other, and includes a configuration in which the two wavelength ranges partly overlap each other.

FIG. 1 is a schematic diagram showing the schematic configuration of the light source device 1 and the image projector 2 among the components of the projector 100. For convenience of explanation, the size and mutual distance between the parts of the light source device 1 and the image projector 2 in FIG. 1 may differ from the size, distance, etc. of the actual projector 100 (the same applies to FIGS. 7 to 9, 12, and 14 to 19 below). The projector 100 may also have components other than the light source device 1 and the image projector 2 illustrated in FIG. 1, such as a cooling unit that cools various parts of the projector 100.

<Summary of Configuration and Operation of Light Source Device>

As illustrated in FIG. 1, the light source device 1 has a first light source 21, a first polarization converter 31, an optical member 40, a fluorescent emitter 70, a lens group 91, an MLA 92 (microlens array), and a lens 93. The first light source 21 emits linearly polarized blue light LB. The first polarization converter 31 is an optical element capable of transmitting the blue light LB emitted by the first light source 21 while switching the polarization direction. The optical member 40 has a first polarization beam splitter 50 (see FIG. 7) having a first optical surface 51 that separates the incident light into light beams of different polarization directions from each other, and a dichroic mirror 60 (see FIG. 7) having a second optical surface 61 that intersects the first optical surface 51 and that is perpendicular to the first optical surface 51. The fluorescent emitter 70 has a phosphor wheel 73 (rotator) (see FIG. 5) that rotates about a rotation axis 74. This phosphor wheel 73 has a first phosphor 71 (see FIG. 5) that emits fluorescence of the green wavelength range (green light LG) in response to incidence of the blue light LB, and a second phosphor 72 (see FIG. 5) that emits fluorescence of the red wavelength range (red light LR) in response to incidence of the blue light LB. In the following, the direction in which the first light source 21 emits the blue light LB is defined as a +Y direction. The direction normal to the installation surface of the light source device 1 in the projector 100 is defined as a +Z direction. The direction perpendicular to the +Y direction and +Z direction and directed from the light source device 1 to the image projector 2 is defined as a +X direction.

The first light source 21 emits linearly polarized light in the +Y direction that is p-polarized light due to the first optical surface 51 of the first polarization beam splitter 50. Here, the linearly polarized light that is p-polarized light due to the first optical surface 51 is linearly polarized light whose electric field oscillates in a direction parallel to a plane through which incident light to and reflected light from the first optical surface 51 pass (in this embodiment, a plane parallel to the XY plane). The linearly polarized light that is s-polarized light due to the first optical surface 51 is linearly polarized light whose electric field oscillates in a direction perpendicular to the plane through which incident light to and reflected light from the first optical surface 51 pass (in this embodiment, in the Z direction). In the period when the p-polarized blue light LB emitted by the first light source 21 is converted to the s-polarized light by the first polarization converter 31, this s-polarized blue light LB is reflected by the first optical surface 51 of the first polarization beam splitter 50 in the +X direction (first direction) and is output to the outside of the light source device 1.

In the period when the p-polarized blue light LB emitted by the first light source 21 passes through the first polarization converter 31 while it is still p-polarized, the blue light LB passes through the first optical surface 51 and the second optical surface 61, is guided in the +Y direction (second direction), and is incident on the fluorescent emitter 70. In the period when the blue light LB is incident on the first phosphor 71 as a result of rotation of the phosphor wheel 73 in the fluorescent emitter 70, the first phosphor 71 emits the green light LG that is reflected by the second optical surface 61 of the dichroic mirror 60 and is output in the +X direction. In the period when the blue light LB is incident on the second phosphor 72 as a result of rotation of the phosphor wheel 73, the second phosphor 72 emits the red light LR that is reflected by the second optical surface 61 of the dichroic mirror 60 and is output in the +X direction.

In this way, the light source device 1 outputs the blue light LB, the green light LG, and the red light LR in turn at different timings. The light output by the light source device 1 enters the image projector 2.

In the present specification, of the linearly polarized light emitted by the first light source 21 and guided to the fluorescent emitter 70 via the first optical surface 51, the linearly polarized light immediately after passing (or being reflected in the modified example 2 described later) through the first optical surface 51 corresponds to "second linearly polarized light." Linearly polarized light whose polarization direction is perpendicular to the second linearly polarized light corresponds to "first linearly polarized light." Therefore, in the present embodiment, the p-polarized light corresponds to the "second linearly polarized light", and the s-polarized light corresponds to the "first linearly polarized light."

<Summary of Configuration and Operation of Image Projector>

As illustrated in FIG. 1, the image projector 2 has a reflective mirror 101, a display element 102, and a projection lens group 103.

The reflective mirror 101 reflects the light output by the light source device 1 toward the display element 102.

The display element 102 is a spatial optical modulator (SOM), for example, a digital micro mirror device (DMD). The DMD modulates the light from the reflective mirror 101 to form a light image (image) and reflects it to the projection lens group 103. In detail, the DMD individually switches tilt angles of the multiple micro mirrors arrayed in an array at high speed depending on the pixel values of the image data for the image to be projected, and determines whether or not to reflect light to the projection lens group 103 for each pixel and each image frame, thereby forming an optical image with the reflected light.

The projection lens group 103 guides and projects the output light image by the display element 102 in a predetermined output direction. The output light image is projected as an image on a projection surface such as a screen. The projection lens group 103 includes multiple lenses, and can adjust the focal length and the magnification (zoom factor) of the output image by changing the positional relationship of the lenses in the optical axis direction.

In a frame period when the light source device 1 outputs the blue light LB, the display element 102 forms a blue light image using the blue light LB, and the blue image is projected. In a frame period when the light source device 1 outputs the green light LG, the display element 102 forms a green light image using the green light LG, and the green image is projected. In the frame period when the light source device 1 outputs the red light LR, the display element 102 forms a red light image using the red light LR, and the red image is projected. By repeated switching of these frame periods when blue, green, and red images are each projected at high frequencies, an image that is perceived as a color image combining the blue, green, and red images is projected.

<Functional Configuration of Projector>

Figure 2:
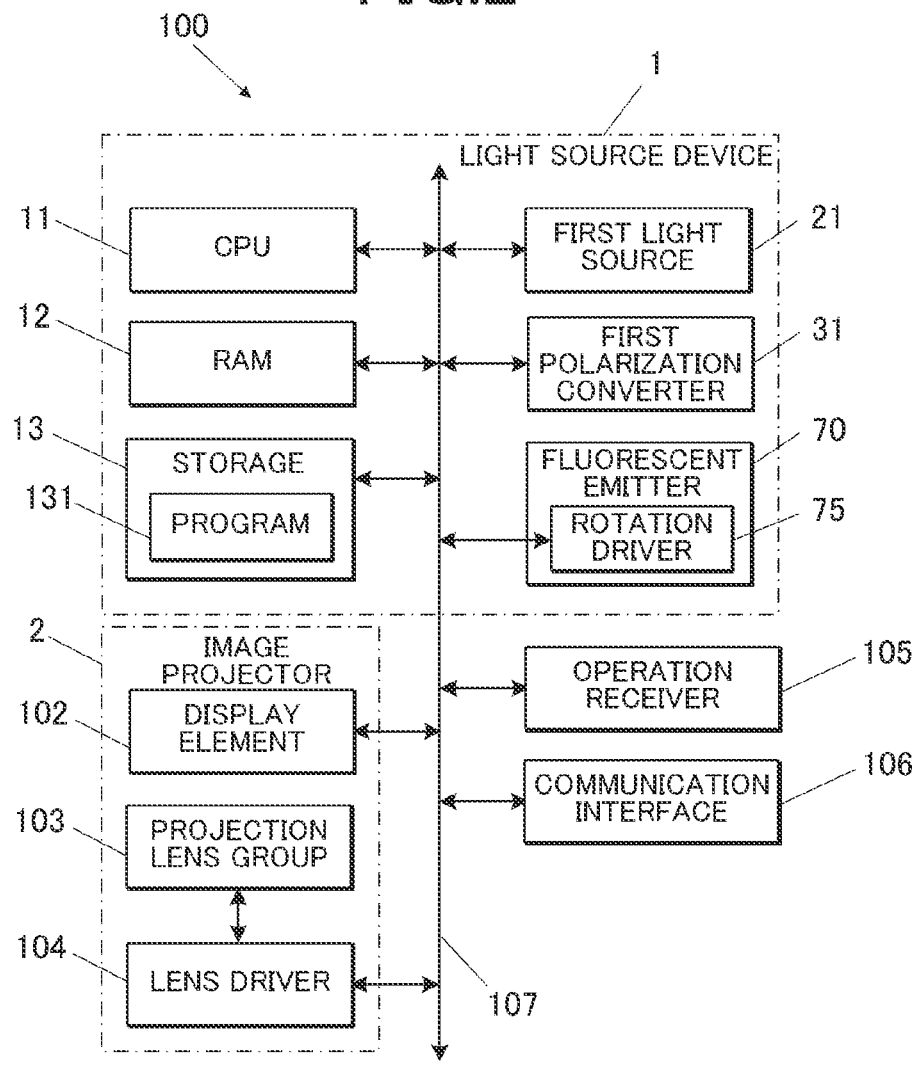
FIG. 2 is a block diagram illustrating a functional configuration of the projector.

FIG. 2 is a block diagram showing a functional configuration of the projector 100.

The projector 100 includes a CPU 11 (Central Processing Unit), a RAM 12 (Random Access Memory), a storage 13, a first light source 21, a first polarization converter 31, a fluorescent emitter 70 with a rotation driver 75, a display element 102, a projection lens group 103, a lens driver 104, an operation receiver 105, a communication interface 106, and a bus 107. Among these, the light source device 1 includes the CPU 11, the RAM 12, the storage 13, the first light source 21, the first polarization converter 31, the fluorescent emitter 70, and the rotation driver 75. The image projector 2 includes the display element 102, the projection lens group 103, and the lens driver 104. Each part of the projector 100 is connected via the bus 107.

The CPU 11 is a processor (processing unit) that reads and executes a program 131 stored in the storage 13 and performs various arithmetic operations to control the operations of the light source device 1 and the projector 100. The light source device 1 and the projector 100 may have multiple processors (for example, multiple CPUs), such that multiple processes executed by the CPU 11 in this embodiment are executed by the multiple processors. In this case, the multiple processors may be involved in a common process, or may independently execute different processes in parallel. The CPU 11 performs various processes according to the program 131 and functions as a first controller that controls the first polarization converter 31, a light emission controller that controls light emission operations (emission timing and the like) by the first light source 21, and the like.

The RAM 12 provides the CPU 11 with a working memory space and stores temporary data.

The storage 13 is a non-transitory storage medium readable by the CPU 11 as a computer and stores the program 131 and various kinds of data. The storage 13 includes a non-volatile memory, such as a hard disk drive (HDD), a solid state drive (SSD), or the like. The program 131 is stored in storage 13 in the form of computer-readable program code.

The first light source 21 emits the blue light LB according to the control signal from the CPU 11. The first polarization converter 31 switches the polarization direction of the input linearly polarized light according to the control signal transmitted by the CPU 11. The detailed configurations and operations of the first light source 21 and the first polarization converter 31 are described later.

According to the control signal from the CPU 11, the rotation driver 75 of the fluorescent emitter 70 operates the rotation motor (not shown in the drawings) for rotating the phosphor wheel 73 and rotates the phosphor wheel 73 at a predetermined rotational rate. The rotation driver 75 also has a rotation detection unit (not shown in the drawings) that detects the rotation angle of the phosphor wheel 73, and outputs a signal related to the detection result to the CPU 11. The rotation detection unit includes, but is not limited to, a rotary encoder attached to the phosphor wheel 73.

The display element 102 is a DMD in the present embodiment, and switches the tilt angles of the multiple micro mirrors arrayed in an array based on the control signal from the CPU 11 and the image data and forms an optical image with the reflected light from the micro mirrors.

According to the control signal from the CPU 11, the lens driver 104 moves at least a part of the multiple lenses constituting the projection lens group 103 in the optical axis direction and adjusts the focal length and zoom factor of the projection lens group 103. The lens driver 104 includes an actuator that moves the lens to be moved in the optical axis direction. The lens driver 104 operates the actuator according to the control by the CPU 11, thereby changing the positional relationship of the multiple lenses in the optical axis direction and adjusting the focal length and zoom factor.

The operation receiver 105 includes multiple pushbutton switches etc., receives input operations by a user, and outputs operation signals representing the contents of the input operations to the CPU 11. The operation receiver 105 may also have a remote controller and the like. In this case, the operation receiver 105 may have a receiver that receives a signal (such as an infrared signal) from the remote controller.

The communication interface 106 receives and obtains the input image data of the image to be projected from an external device. For example, the communication interface 106 has an input terminal to which a cable for data communication with an external device is connected and/or a wireless LAN interface for a wireless LAN communication connection with an external device, and obtains the image data via the input terminal and/or the wireless LAN interface.

<Detailed configuration and Operation of Light Source Device>

Next, the configurations and operations of the light source device 1 are described in detail.

(First Light Source)

The first light source 21 illustrated in FIG. 1 has a laser diode (emitter) that outputs a laser beam as the blue light LB. FIG. 1 schematically illustrates the first light source 21 having one laser diode and a collimator lens that collimates the laser light emitted by the laser diode. However, the first light source 21 is not limited to this configuration, but may have, for example, multiple laser diodes arrayed in a line or matrix shape on a substrate and an optical system (such as a mirror and a lens) for focusing the laser beams emitted by the respective laser diodes into a single laser beam.

The laser diode of the first light source 21 has, for example, a double hetero structure with an active layer (light-emitting layer) between an n-type clad layer and a p-type clad layer. In response to the voltage applied from the outside, electrons and holes combine in the active layer to emit light, and resonance between the end surfaces of the active layer causes stimulated emission, resulting in laser oscillation. At this time, light of a certain polarization direction oscillates, and the oscillation of light of a polarization direction perpendicular to the certain polarization direction is suppressed, so that the laser diode (that is, the first light source 21) emits the linearly polarized blue light LB. The first light source 21 of the present embodiment emits linearly polarized blue light LB that is p-polarized light due to the first optical surface 51 of the first polarization beam splitter 50.

(First Polarization Converter)

The first polarization converter 31 is located on an optical path of the blue light LB from the first light source 21 to the first optical surface 51 of the first polarization beam splitter 50. The first polarization converter 31 can be in either of the two states: an ON state (first state) in which the polarization direction of the linearly polarized incident light is converted to a polarization direction perpendicular to the polarization direction and then transmitted; and an OFF state (second state) in which the linearly polarized incident light passes without conversion of the polarization direction. The CPU 11 (first controller) can switch the state of the first polarization converter 31 between the on state and the off state. As a result, the CPU 11 controls the first polarization converter 31 such that the blue light LB having passed the first polarization converter 31 and being incident on the first optical surface 51 is switched between the s-polarized light and the p-polarized light.

In the present embodiment, a liquid crystal element is used as the first polarization converter 31. The liquid crystal element has, for example, a configuration in which a liquid crystal layer is sealed between two transparent substrates each having a transparent electrode on a surface facing to each other. The thickness of the liquid crystal layer, etc., of the liquid crystal element is adjusted such that the liquid crystal layer to which a first driving voltage is applied via a transparent electrode changes the polarization direction of the linearly polarized incident light by 90°, and that the liquid crystal layer to which a second driving voltage that is different from the first driving voltage is applied does not change the polarization direction of the linearly polarized incident light. In other words, the liquid crystal element is in the ON state when the first driving voltage is applied and is in the OFF state when the second driving voltage is applied. The first driving voltage may be either larger than the second driving voltage or smaller than the second driving voltage. One of the first driving voltage and the second driving voltage may be 0 V. The first polarization converter 31 is not limited to one having a liquid crystal element, but may also include, for example, a magneto-optical element that generates a magnetic field when energized and changes the polarization plane to a predetermined direction.

(Optical Member, First Polarization Beam Splitter, and Dichroic Mirror)

The optical member 40 is located on an optical path of the blue light LB emitted by the first light source 21 and passing through the first polarization converter 31. The optical member 40 has a cube shape (rectangular shape) consisting of four triangular prisms P1 to P4 joined together. Each of the prisms P1 to P4 is a triangular prism whose cross section perpendicular to the Z direction is an isosceles right-angled triangle. The four prisms P1 to P4 are joined with a transparent resin or the like such that edges forming right angles in the above isosceles right-angled triangles contact each other. Thus, the four prisms are joined to form two interfaces that are parallel to the Z direction and orthogonal to each other. The cross-section of the optical member 40 perpendicular to the Z direction is in a square shape. The optical member 40 is set in such a way that the sides of the square are parallel to the X direction or Y direction. Of the surfaces of the optical member 40, the surface facing the +X direction is the surface of the prism P1, the surface facing the −Y direction is the surface of the prism P2, the surface facing the −X direction is the surface of the prism P3, and the surface facing the +Y direction is the surface of the prism P4.

On the surfaces of the prisms P1 and P2 respectively facing the prisms P4 and P3 (hereinafter collectively referred to as a "first optical surface 51"), a first optical thin layer (not shown in the drawings) that functions as a polarization beam splitter is formed by vapor deposition or the like. The prisms P1 and P2 having the first optical surface 51 with the first optical thin layer constitute the first polarization beam splitter 50 (see FIG. 7). The first optical surface 51 is parallel to the Z direction, and the cross-section of the first optical surface 51 parallel to the XY plane is inclined at an angle of +45° to the X axis. The first light source 21 and the fluorescent emitter 70 are located on opposite sides of a first virtual plane S1 between them. The first virtual plane S1 includes the first optical surface 51 and extends parallel to the first optical surface 51.

Figure 3:
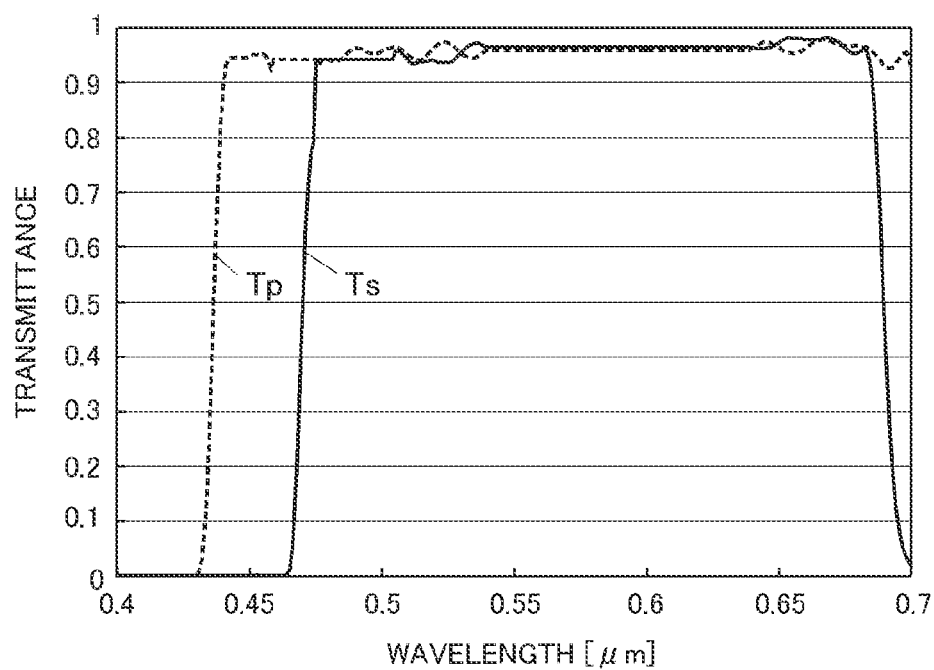
FIG. 3 is a diagram illustrating transmission performance of a first optical surface of a first polarization beam splitter.

FIG. 3 is a diagram illustrating the transmission performance of the first optical surface 51 of the first polarization beam splitter 50.

The data set Tp in FIG. 3 illustrates wavelength dependence (transmission spectrum) of the transmittance of the p-polarized light that is incident on the first optical surface 51 at a certain angle (45° in this case). The data set Ts illustrates wavelength dependence (transmission spectrum) of the transmittance of the s-polarized light that is incident on the first optical surface 51 at the certain angle. These data sets Tp and Ts illustrate that the first optical surface 51 has a high transmittance (0.9 or higher) for p-polarized light of the blue wavelength range (around 0.45 μm) of the visible light wavelength range, and that the first optical surface 51 transmits little s-polarized light, that is, reflects most of the s-polarized light. These data sets Tp and Ts also illustrate that the first optical surface 51 has a high transmittance for light of the green and red wavelength ranges, which are relatively long wavelengths in visible light.

When the blue light LB emitted in the +Y direction by the first light source 21 illustrated in FIG. 1 is incident on the first optical surface 51, the first optical surface 51 having such a transmission performance reflects the s-polarized light and guides the s-polarized light in the +X direction (first direction), while transmitting the p-polarized light and guides the p-polarized light in the +Y direction (second direction) and incident on the fluorescent emitter 70. When the s-polarized blue light LB travelling in the −Y direction is incident on the first optical surface 51, the first optical surface 51 reflects the s-polarized blue light LB to the −X direction. When the p-polarized blue light LB travelling in the −Y direction is incident on the first optical surface 51, the first optical surface 51 transmits the p-polarized blue light LB. The first optical surface 51 transmits the green light LG and the red light LR are incident on the first optical surface 51.

On the surfaces of the prisms P2 and P3 respectively facing the prisms P1 and P4 (hereinafter collectively referred to as a "second optical surface 61"), a second optical thin layer (not shown in the drawings) that functions as a mirror having wavelength-dependent reflectance (transmittance) is formed by vapor deposition or the like. The prisms P2 and P3 having the second optical surface 61 with the second optical thin layer constitute the dichroic mirror 60 (see FIG. 7). The second optical surface 61 is parallel to the Z direction and the cross-section of the second optical surface 61 parallel to the XY plane is inclined at an angle of +135° (−45°) to the X axis. Thus, the second optical surface 61 is perpendicular to the first optical surface 51.

The second optical surface 61 intersects the first optical surface 51. Here, intersection of the first optical surface 51 and the second optical surface 61 means that the first and second optical surfaces 51, 61 intersect each other such that an intersection line is formed on the first optical surface 51 and on the second optical surface 61. That is, the intersection does not include a situation in which a virtual plane extending one of the first optical surface 51 and the second optical surface 61 intersects the other. The intersection also does not include a situation in which a virtual plane extending the first optical surface 51 intersects a virtual plane extending the second optical surface 61.

Figure 4:
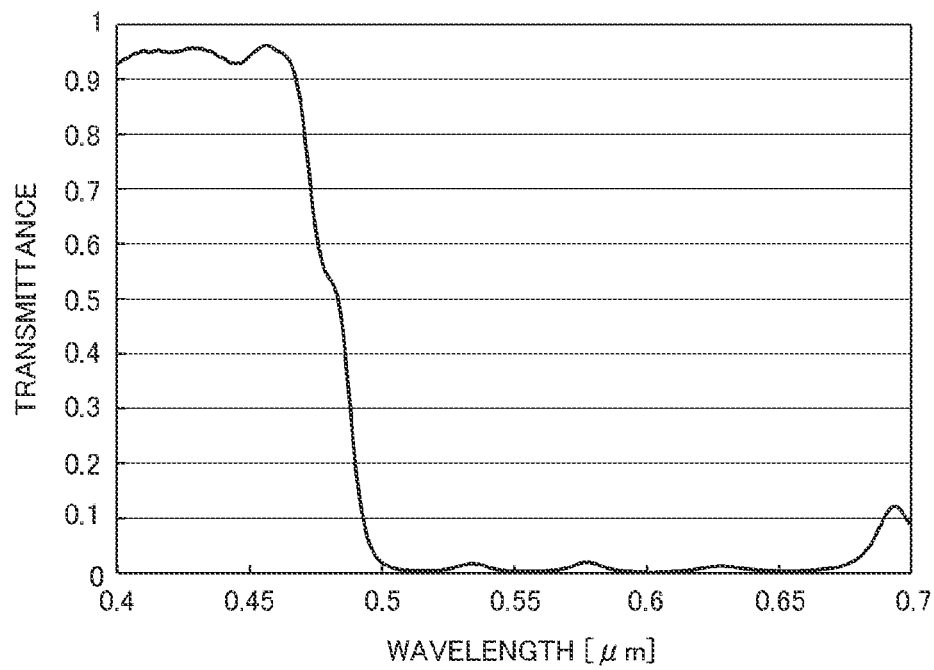
FIG. 4 is a diagram illustrating transmission performance of a second optical surface of a dichroic mirror.

FIG. 4 is a diagram illustrating the transmission performance of the second optical surface 61 of the dichroic mirror 60.

The graph in FIG. 4 illustrates the wavelength dependence (transmission spectrum) of the transmittance of the light incident on the second optical surface 61 at a certain angle (45° in this case). The graph in FIG. 4 illustrates that the second optical surface 61 transmits little incident light (that is, reflects most of the incident light) of the green and red wavelength ranges (longer than 0.5 μm) of the visible light wavelength range, and that the second optical surface 61 has a high transmittance (0.9 or higher) for light of the blue wavelength range, which are relatively short wavelength range.

The second optical surface 61 having such a transmission performance reflects the green light LG and the red right LR emitted by the fluorescent emitter 70 illustrated in FIG. 1. For example, when the green light LG and red light LR traveling in the −Y direction are incident on the second optical surface 61, the second optical surface 61 reflects the green light LG and red light LR to the +X direction so that the green light LG and red light LR are guided in the +X direction. The second optical surface 61 passes the blue light LB emitted by the first light source 21 regardless of the polarization state. When the blue light LB incident on the fluorescent emitter 70 is reflected by the fluorescent emitter 70 and travels in the −Y direction to the second optical surface 61, the second optical surface 61 passes the blue light LB regardless of the polarization state.

In the above description, the prisms P1 and P2 constitute the first polarization beam splitter 50. However, since the prisms P1 to P4 are joined, it can be said that the prisms P3 and P4 constitute the first polarization beam splitter 50, and the surfaces of the prisms P4 and P3 respectively facing the prisms P1 and P2 may be referred to as the first optical surface 51. The first optical thin layer may be formed by vapor deposition or the like on the surfaces of the prisms P4 and P3 respectively facing the prisms P1 and P2.

Similarly, in the above description, the prisms P2 and P3 constitute the dichroic mirror 60. However, since the prisms P1 to P4 are joined, it can be said that the prisms P1 and P4 constitute the dichroic mirror 60, and the surfaces of the prisms P1 and P4 respectively facing the prisms P2 and P3 may be referred to as the second optical surface 61. The second optical thin layer may be formed by vapor deposition or the like on the surfaces of the prisms P1 and P4 respectively facing the prisms P2 and P3.

Alternatively, the entire optical member 40 can be regarded as the first polarization beam splitter 50 having a first optical surface 51 at the interface between the prisms P1, P2 and the prisms P4, P3. The entire optical member 40 can also be regarded as the dichroic mirror 60 having the second optical surface 61 at the interface between the prisms P2, P3 and the prisms P1, P4.

(Fluorescent Emitter)

As illustrated in FIG. 1, the fluorescent emitter 70 has a disk-shaped phosphor wheel 73 and a rotation driver 75 that rotates the phosphor wheel 73 about a rotation axis 74 parallel to the Y direction. The fluorescent emitter 70 is located on the optical path of the blue light LB emitted by the first light source 21 and passing through the first polarization converter 31 and the optical member 40.

FIG. 5 is a diagram illustrating the configuration of the phosphor wheel 73.

The phosphor wheel 73 is a disk of a metal or the like, and the plate surface of the phosphor wheel 73 is perpendicular to the Y-direction. The first phosphor 71 and the second phosphor 72 described above are provided on the plate surface on the −Y direction side of the phosphor wheel 73. The first phosphor 71 and the second phosphor 72 are each provided across an area along about ⅓ of the circumference of the phosphor wheel 73 in FIG. 5. The fluorescent emitter 70 is located such that the blue light LB emitted by the first light source 21 and passing through the first polarization converter 31 and the optical member 40 is incident on the first phosphor 71 or the second phosphor 72, depending on the rotation of the phosphor wheel 73. The areas across which the first phosphor 71 and the second phosphor 72 are formed do not necessarily have to be along about ⅓ of the circumferential direction, but may be changed depending on the length (proportion) of the frame period when the red and green images are each projected.

In the period when the first phosphor 71 is located on the light path of the blue light LB in the rotation cycle of the phosphor wheel 73, the green light LG that is green fluorescence is generated in response to the blue light LB (excitation light) incident on the first phosphor 71, and travels in a direction having a component opposite to the traveling direction of the blue light LB. In the period when the second phosphor 72 is located on the light path of the blue light LB in the rotation cycle of the phosphor wheel 73, the red light LR that is red fluorescence is generated in response to the blue light LB (excitation light) incident on the second phosphor 72, and travels in a direction having a component opposite to the traveling direction of the blue light LB.

(Lens and MLA)

The lens group 91 illustrated in FIG. 1 focuses the blue light LB having passed through the optical member 40 and travelling to the fluorescent emitter 70.

The MLA 92 shapes the blue light LB having reflected by the first optical surface 51 of the first polarization beam splitter 50 and traveling in the +X direction, and the green light LG and the red light LR having reflected by the second optical surface 61 of the dichroic mirror 60 and traveling in the +X direction depending on the shape (for example, rectangular) of the display element 102.

The lens 93 focuses the blue light LB, the green light LG, and the red light LR having passed through the optical member 40 and traveling toward the reflective mirror 101.

(Operation of Light Source Device)

Next, the operations of the light source device 1 is explained with reference to FIG. 6 to FIG. 8.

FIG. 6 is a diagram illustrating the state of the light source device 1 in the frame period when the red light LR, the green light LG, and the blue light LB are each emitted.

In detail, FIG. 6 illustrates the state of the first light source 21, the state of the first polarization converter 31, and an incident position of the blue light LB on the phosphor wheel 73 in each of the frame period Fr when the red light LR is emitted, the frame period Fb when the green light LG is emitted, and the frame period Fb when the blue light LB is emitted. As illustrated in FIG. 6, in the present embodiment, the first light source 21 is in an "ON" state when the blue light LB is emitted in any of the frame periods Fr, Fg, and Fb.

Figure 7:
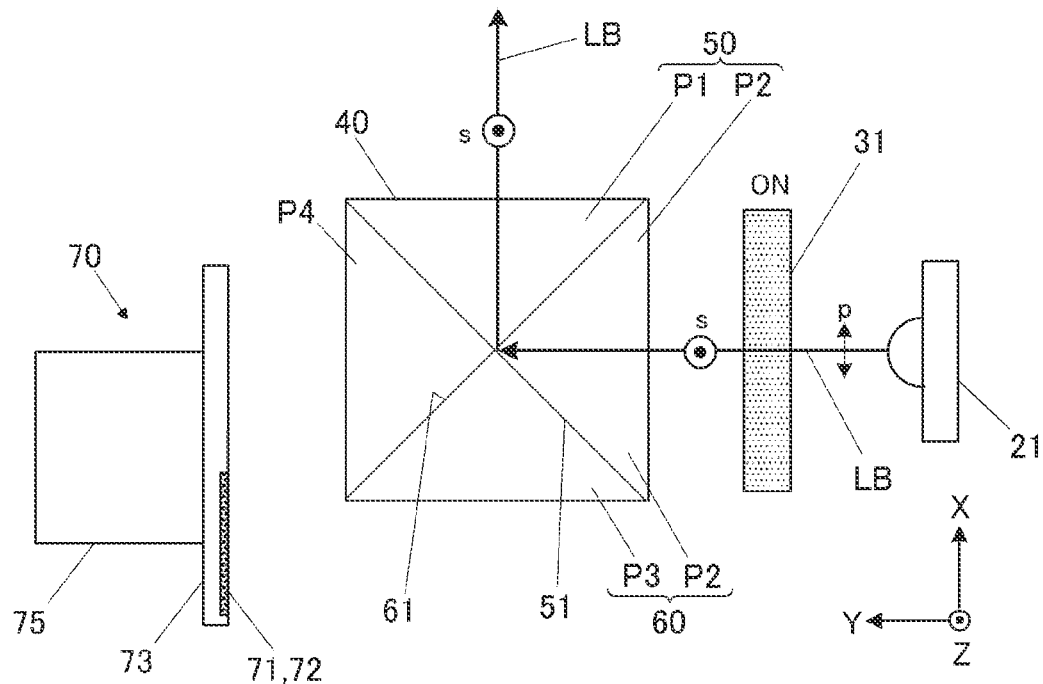
FIG. 7 is a diagram illustrating an operation of the light source device in the frame period when the blue light is output.

FIG. 7 is a diagram illustrating the operation of the light source device 1 in the frame period Fb when the blue light LB is output.

Figure 8:
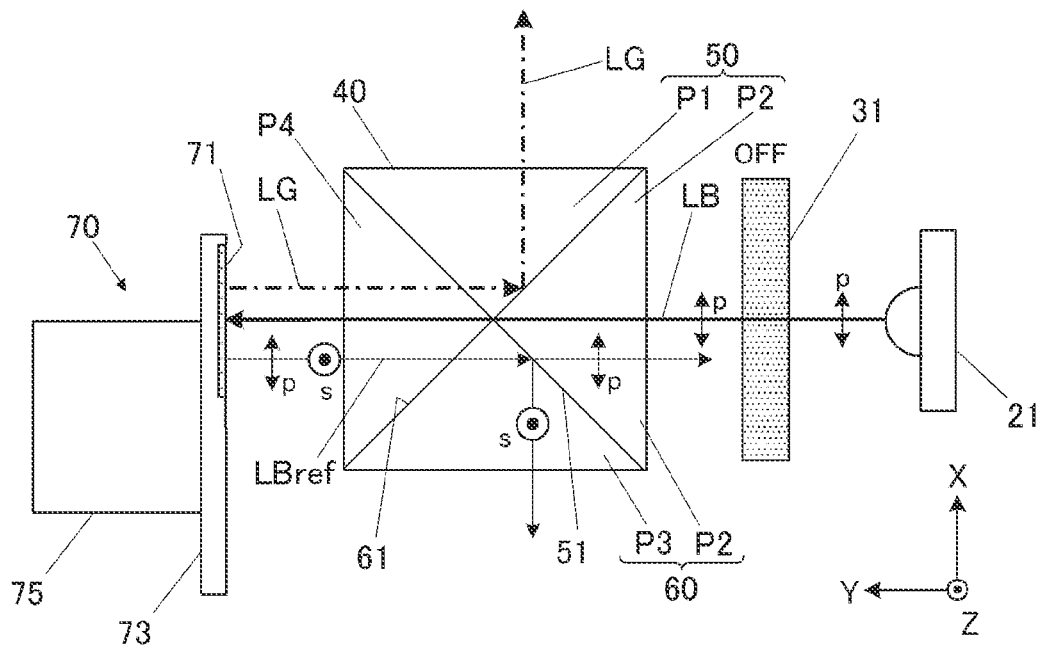
FIG. 8 is a diagram illustrating an operation of the light source device in the frame period when the green light is output.

FIG. 8 is a diagram illustrating the operation of the light source device 1 in the frame period Fg when the green light LG is output.

In FIG. 7 and FIG. 8, the lens group 91, the MLA 92, and the lens 93 are omitted.

The signs "s" in FIG. 7 and FIG. 8 each represent the s-polarized light, and the signs "p" each represent the p-polarized light. The arrows in the vicinity of the signs "s" and "p" each represent the oscillating direction of the electric field of linearly polarized light. As described above, in the present embodiment, the p-polarized light is linearly polarized light whose oscillating direction of the electric field is parallel to the XY plane, and the s-polarized light is linearly polarized light whose oscillating direction of the electric field is perpendicular to the XY plane.

As illustrated in FIG. 6 and FIG. 7, in the frame period Fb when the blue light LB is output, the first drive voltage is applied to the liquid crystal element of the first polarization converter 31 under control by the CPU 11, so that the first polarization converter 31 is in the ON state. As a result, as illustrated in FIG. 7, the p-polarized blue light LB emitted by the first light source 21 is converted to the s-polarized blue light LB by the first polarization converter 31. The blue light LB converted to s-polarized light travels in the +Y direction, is incident on the first optical surface 51 of the first polarization beam splitter 50, and is reflected in the +X direction. When the s-polarized blue light LB is incident on the second optical surface 61 of the dichroic mirror 60 before reaching the first optical surface 51, the s-polarized blue light LB passes through the second optical surface 61 and then is incident on the first optical surface 51 to be reflected in the +X direction. The s-polarized blue light LB traveling in the +X direction is output from the light source device 1 and enters the image projector 2.

As illustrated in FIG. 6 and FIG. 8, in the frame period Fg when the green light LG is output, the second drive voltage is applied to the liquid crystal element of the first polarization converter 31 under control by the CPU 11, and the first polarization converter 31 is in the OFF state. As a result, as illustrated in FIG. 8, the p-polarized blue light LB emitted by the first light source 21 passes through the first polarization converter 31 while it is still p-polarized. The p-polarized blue light LB travels in the +Y direction, passes through the first optical surface 51 of the first polarization beam splitter 50 and the second optical surface 61 of the dichroic mirror 60, and is incident on the phosphor wheel 73.

Here, as illustrated in FIG. 6, the incident position of the blue light LB on the phosphor wheel 73 in the frame period Fg is in the first phosphor 71. In other words, the frame period Fg depends on the rotational position of the phosphor wheel 73 and is defined as the period when the incident position of the blue light LB on the phosphor wheel 73 is in the first phosphor 71. In detail, the CPU 11 identifies the rotation angle of the phosphor wheel 73 based on the signal output by the rotation detection unit of the rotation driver 75. Then, the CPU 11 turns off the first polarization converter 31 in the frame period Fg when the rotation angle is within the angle range where the blue light LB is incident on the first phosphor 71. As a result, the p-polarized blue light LB is incident on the first phosphor 71 in the frame period Fg.

As illustrated in FIG. 8, the first phosphor 71 emits the green light LG in response to the incident blue light LB. The green light LG travels in the direction having a component along the −Y direction and is reflected by the second optical surface 61 of the dichroic mirror 60 in the direction having a component along the +X direction. For example, the green light LG traveling in the −Y direction is reflected in the +X direction by the second optical surface 61. When the green light LG is incident on the first optical surface 51 of the first polarization beam splitter 50 before reaching the second optical surface 61, the green light LG passes through the first optical surface 51 and then is incident on the second optical surface 61 to be reflected in the +X direction. The green light LG traveling in the direction having a component along the +X direction is focused by the MLA 92 and the lens 93, is output from light source device 1, and enters the image projector 2.

On the other hand, part of the p-polarized blue light LB incident on the first phosphor 71 is not used for excitation of fluorescence in the first phosphor 71, but is reflected in the −Y direction by the surface of the first phosphor 71. This reflected light is hereinafter referred to as "blue reflected light LBref". Since the polarization is disturbed upon reflection by the first phosphor 71, the blue reflected light LBref is randomly polarized light including p-polarization component and s-polarization component, as illustrated in FIG. 8. The p-polarized component of the blue reflected light LBref passes through the first optical surface 51 of the first polarization beam splitter 50 and the second optical surface 61 of the dichroic mirror 60 and travels in the −Y direction. The s-polarized component of the blue reflected light LBref is reflected in the −X direction by the first optical surface 51 of the first polarization beam splitter 50 and travels in the −X direction. Thus, all polarization components of the blue reflected light LBref travel in a direction different from the green light LG. Therefore, it is possible to reduce the occurrence of the problems that light of a desired color cannot be output due to mixing and blending of the green light LG and the blue light LB (blue reflected light LBref).

As illustrated in FIG. 6, the state of the light source device 1 in the frame period Fr when the red light LR is output is the same as the state of the light source device 1 in the frame period Fg, except that the incident position of the blue light LB on the phosphor wheel 73 is in the second phosphor 72. Therefore, the state and the operation of the light source device 1 in the frame period Fr correspond to those illustrated in FIG. 8 and explained above for the frame period Fg, except that the "first phosphor 71" is changed to the "second phosphor 72" and that the "green light LG" is changed to the "red light LR." Therefore, detailed explanation of the frame period Fr is omitted.

Although the first light source 21 emits the p-polarized light in the example explained above, the first light source 21 may emit the s-polarized light. In that case, the first polarization converter 31 is set to be in the OFF state in the frame period Fb when the blue light LB is output, and the first polarization converter 31 is set to be in the ON state in the frame periods Fg and Fr when the green light LG and the red light LR are respectively output.

As described above, the light source device 1 according to the first embodiment includes the first polarization beam splitter 50 and the dichroic mirror 60. The first polarization beam splitter 50 has the first optical surface 51 that separates the incident light into light beams having different polarization directions from each other. The dichroic mirror 60 has the second optical surface 61. The second optical surface 61 intersects the first optical surface 51 and guides the reflection light and fluorescence in different directions. The reflection light is part of incident light that has been emitted by the first light source 21, incident on the fluorescent emitter 70 via the first optical surface 51, and reflected by the fluorescent emitter 70. The fluorescence is emitted by the fluorescent emitter 70 in response to the incident light on the fluorescent emitter 70.

According to such a configuration, one linearly polarized component (s-polarized light) of the blue light LB can be guided by the first optical surface 51 and output. Also, the fluorescence emitted by the fluorescent emitter 70 in response to the incidence of the other linearly polarized component (p-polarized light) of the blue light LB can be guided and output by the second optical surface 61. Thus, it is possible to output light of different colors from each other.

In addition, the fluorescence (the green light LG and the red light LR) emitted by the fluorescent emitter 70 and the blue light LB (blue reflected light LBref) reflected by the fluorescent emitter 70 can be guided in different directions because of the second optical surface 61. That is, the fluorescence and the reflected blue light LB can be separated from each other. Therefore, it is possible to reduce the occurrence of the problems that light of a desired color cannot be output due to mixing and blending of the fluorescence and the blue light LB. Thus, light of an appropriate color can be output.

Since the first polarization beam splitter 50 and the dichroic mirror 60 are provided such that the first optical surface 51 intersects the second optical surface 61, the first polarization beam splitter 50 and the dichroic mirror 60 can be arranged in a small area. Also, since the first optical surface 51 intersects the second optical surface 61, the blue light LB guided by the first optical surface 51 to be output and the fluorescence guided by the second optical surface 61 to be output can follow one optical path in common. Therefore, the optical system for the output light can be simplified compared to the conventional configuration in which a dedicated optical path for blue light LB is provided. As a result, the size and cost of the light source device 1 can be reduced.

When the blue light LB of the blue wavelength range emitted by the first light source 21 is incident on the first optical surface 51, the first optical surface 51 guides the s-polarized light (first linearly polarized light) that is part of the blue light LB in the +X direction (first direction) and guides the p-polarized light (second linearly polarized light) that is part of the blue light LB in the +Y direction (second direction) that is different from the +X direction to the fluorescent emitter 70. The second optical surface 61 guides, in the +X direction, at least part of the fluorescence emitted by the fluorescent emitter 70 in response to the incident blue light LB, and guides the blue light LB reflected by the fluorescent emitter 70 in a direction different from the +X direction. As a result, the blue light LB (s-polarized light) guided by the first optical surface 51 and the fluorescence guided by the second optical surface 61 can be output in the same direction (+X direction). Therefore, the blue light LB and the fluorescence can be output through one common optical path. In addition, the second optical surface 61 certainly separates the blue light LB reflected by the fluorescent emitter 70 from the fluorescence, thereby preventing color mixing.

The light source device 1 also has the first polarization converter 31 and the CPU 11. The first polarization converter 31 is provided on the optical path of the blue light LB from the first light source 21 to the first optical surface 51. The CPU 11 (first controller) controls the first polarization converter 31 such that the blue light LB incident on the first optical surface 51 is switched between the s-polarized light and the p-polarized light. According to this, while the blue light LB is s-polarized light because of the switching of the first polarization converter 31, the s-polarized light can be guided in the +X direction through the first optical surface 51 and output. While the blue light LB is the p-polarized light because of the switching of the first polarization converter 31, the p-polarized light is guided to the fluorescent emitter 70 via the first optical surface 51, and the fluorescence generated there can be guided in the +X direction by the second optical surface 61 and output.

The fluorescent emitter 70 has the first phosphor 71 and the second phosphor 72. In response to the incident blue light LB, the first phosphor 71 emits the green light LG of the green wavelength range that is different from the blue wavelength range. In response to the incident blue light LB, the second phosphor 72 emits the red light LR of the red wavelength range that is different from the blue wavelength range. The second optical surface 61 guides the green light LG emitted by the first phosphor 71 and the red light LR emitted by the second phosphor 72 in the +X direction. As a result, three colors of light, blue light LB, green light LG, and red light LR, can be output using the first light source 21 of the blue light. Accordingly, the configuration of the light source device 1 can be simple compared to a configuration in which two or more light sources that output light of different colors are provided.

The fluorescent emitter 70 has the phosphor wheel 73 with the first phosphor 71 and the second phosphor 72. In the period when the blue light LB is incident on the first phosphor 71 depending on the rotational position of the phosphor wheel 73, the first phosphor 71 emits the green light LG. In the period when the blue light LB is incident on the second phosphor 72 as a result of the rotation of the phosphor wheel 73, the second phosphor 72 emits the red light LR. As a result, the green light LG can be obtained and output in the period when the blue light LB is incident on the first phosphor 71 depending on the rotational position of the phosphor wheel 73. The red light LR can be obtained and output in the period when the blue light LB is incident on the second phosphor 72 based on the rotation of the phosphor wheel 73. Also, the optical system can be simplified since the green light LG and the red light LR follow one optical path in common.

The first light source 21 and the fluorescent emitter 70 are provided such that the first virtual plane S1 is located between them. The first virtual plane S1 includes the first optical surface 51 and extends parallel to the first optical surface 51. The first optical surface 51 reflects the s-polarized blue light LB to guide it in the +X direction, and transmits the p-polarized blue light LB to guide it in the +Y direction. As a result, the light source device 1 having a compact configuration can be realized.

The second optical surface 61 is perpendicular to the first optical surface 51. As a result of this, the blue light LB (s-polarized light) guided by the first optical surface 51 and the fluorescence guided by the second optical surface 61 can be output in the same direction (+X direction).

The projector 100 (projection device) of the present embodiment includes the light source device 1 described above and the image projector 2 that projects an image using the light output by the light source device 1. As a result, a high-quality color image can be projected using light of appropriate color output by the light source device 1. The projector 100 using the light source device 1 whose size and cost can be reduced has a lot of flexibility in design, and can be made smaller and less expensive.

Second Embodiment

Next, the second embodiment will be described. The second embodiment differs from the first embodiment in that the red light LR is emitted by a second light source 22 and in the configuration of the fluorescent emitter 70. In the following, the points that differ from the first embodiment are explained, and explanations are omitted for the points equivalent to the first embodiment.

Figure 9:
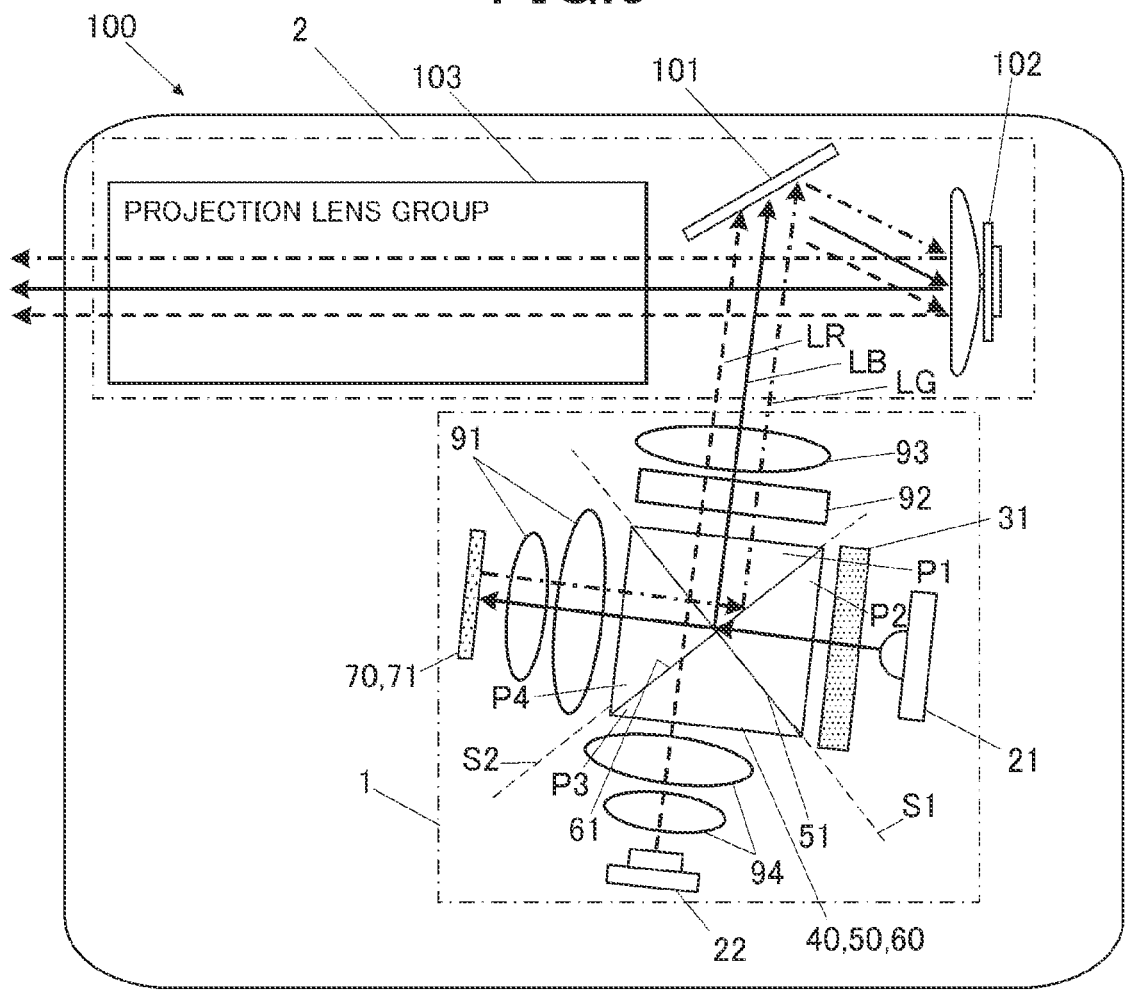
FIG. 9 is a schematic diagram illustrating a configuration of a projector having a light source device according to the second embodiment.

FIG. 9 is a schematic diagram illustrating the configuration of the projector 100 having the light source device 1 according to the second embodiment.

The fluorescent emitter 70 of the second embodiment does not have the second phosphor 72, the phosphor wheel 73, or the rotation driver 75, but has the first phosphor 71 whose position is fixed. The first phosphor 71 is located such that the blue light LB having passed through the first polarization converter 31 and the optical member 40 and traveling in the +Y direction is incident on the first phosphor 71. The surface of the first phosphor 71 on which the blue light LB is incident is perpendicular to the Y direction. The first phosphor 71 may be provided on a surface of a support member (not shown in the drawings) whose position is fixed.

The light source device 1 of the second embodiment has a second light source 22 that emits red light LR (fourth light) of the red wavelength range. The second light source 22 is located such that the red light LR traveling in the +X direction is incident on the first optical surface 51 of the first polarization beam splitter 50 and the second optical surface 61 of the dichroic mirror 60, for example, on the −X direction side of the optical member 40. The CPU 11 controls the light emission operation by the second light source 22. Therefore, in the second embodiment, the CPU 11 functions as the light emission controller that controls light emission operations (emission timing and the like) by the first light source 21 and the second light source 22. A lens group 94 that focuses the red light LR emitted by the second light source 22 is provided on the optical path from the second light source 22 to the first optical surface 51 and the second optical surface 61. The second light source 22 has, for example, an LED (Light Emitting Diode) (emitter) that emits the red light LR, but is not limited thereto.

The second optical surface 61 of the dichroic mirror 60 of the second embodiment reflects the green light LG and transmits the blue light LB and the red light LR.

FIG. 10 illustrates the transmission performance of the second optical surface 61 of the dichroic mirror 60 in the second embodiment.

The graph in FIG. 10 illustrates that the second optical surface 61 transmits little incident light (that is, reflects most of the incident light) of the green wavelength range (about 0.55 μm) of the visible light wavelength range, and that the second optical surface 61 has a high transmittance (0.9 or higher) for light of the blue and red wavelength ranges, which are relatively short and long wavelength ranges, respectively.

The second optical surface 61 having such a transmission performance reflects the green light LG emitted by the first phosphor 71 illustrated in FIG. 9. In detail, the green light LG travelling in the direction having a component along the −Y direction is reflected by the second optical surface 61 in the direction having a component along the +X direction. The blue light LB emitted by the first light source 21 and traveling in the −Y direction passes through the second optical surface 61, is guided in the −Y direction, and is incident on the first phosphor 71. The red light LR emitted by the second light source 22 and traveling in the +X direction passes through the second optical surface 61 and is guided in the +X direction.

The first light source 21, the second light source 22, and the first phosphor 71 (fluorescent emitter 70) are provided in different spaces from one another among the four spaces that are segmented by the first virtual plane S1 and a second virtual plane S2. The first virtual plane S1 includes the first optical surface 51 and extends parallel to the first optical surface 51. The second virtual plane S2 includes the second optical surface 61 and extends parallel to the second optical surface 61.

FIG. 11 is a diagram illustrating the state of the light source device 1 of the second embodiment in the frame period when the red light LR, the green light LG, and the blue light LB are each emitted.

In the frame period Fb when the blue light LB is output, the second light source 22 stops emitting the red light LR ("OFF") under control by the CPU 11. Except for this point, the state and operation of the light source device 1 in the frame period Fb are the same as those in the first embodiment.

In the frame period Fg when the green light LG is output, under control by the CPU 11, the first light source 21 emits the blue light LB ("ON"), the first light source 21 stops emitting the red light LR ("OFF"), and the first polarization converter 31 is in the OFF state. As a result, the p-polarized blue light LB emitted by the first light source 21 passes through the first polarization converter 31 in the +Y direction as p-polarized light and is incident on the first phosphor 71. In response to the incident blue light LB, the first phosphor 71 emits green light LG. The green light LG travels in the direction having a component along the −Y direction, is incident on the second optical surface 61 of the dichroic mirror 60, is reflected in the direction having a component along the +X direction, is output from light source device 1, and enters the image projector 2.

In the frame period Fr when the red light LR is output, as illustrated in FIG. 11, under control by the CPU 11, the first light source 21 stops emitting the blue light LB ("OFF") and the second light source 22 emits the red light LR ("ON"). In FIG. 11, the signs "-" each indicate that the first polarization converter 31 may be in either the ON state or the OFF state. However, of the ON state and the OFF state, the first polarization converter 31 is preferably in the state where the driving voltage to the liquid crystal element is smaller from the viewpoint of reducing power consumption.

The red light LR emitted by the second light source 22 in the +X direction in the frame period Fr passes through the first optical surface 51 of the first polarization beam splitter 50 and the second optical surface 61 of the dichroic mirror 60, is output from the light source device 1, and enters the image projector 2.

As described above, in the second embodiment, the first phosphor 71 of the fluorescent emitter 70 emits the green light LG of the green wavelength range that is different from the blue wavelength range in response to the incident blue light LB. The light source device 1 further has a second light source 22 that emits the red light LR of the red wavelength range that is different from the blue wavelength range and the green wavelength range. The second optical surface 61 guides the green light LG emitted by the fluorescent emitter 70 and the red light LR emitted by the second light source 22 in the +X direction. As a result of this, the light emitted by the second light source 22 can be used as the red light as it is, instead of using fluorescence as the red light LR. Therefore, a red light LR closer to the desired color can be output by adjustment of the characteristics of the second light source 22 etc. In addition, since the rotatable phosphor wheel 73 is not used, operating noise, vibration, and dust due to the rotation of the phosphor wheel 73 can be reduced. In addition, because there are fewer operating parts, the light source device 1 can be simply configured and has improved resistance to external shocks.

The first light source 21, the second light source 22, and the fluorescent emitter 70 are provided in different spaces from one another among the four spaces that are segmented by the first virtual plane S1 and a second virtual plane S2. The first virtual plane S1 includes the first optical surface 51 and extends parallel to the first optical surface 51. The second virtual plane S2 includes the second optical surface 61 and extends parallel to the second optical surface 61. As a result, the light source device 1 having a compact configuration can be realized.

Third Embodiment

Next, the third embodiment is described. The third embodiment differs from the first embodiment in the configuration of the fluorescent emitter 70 and the optical paths of the green light LG and red light LR. In the following, the points that differ from the first embodiment are explained, and explanations are omitted for the points equivalent to the first embodiment.

Figures 12, 13:
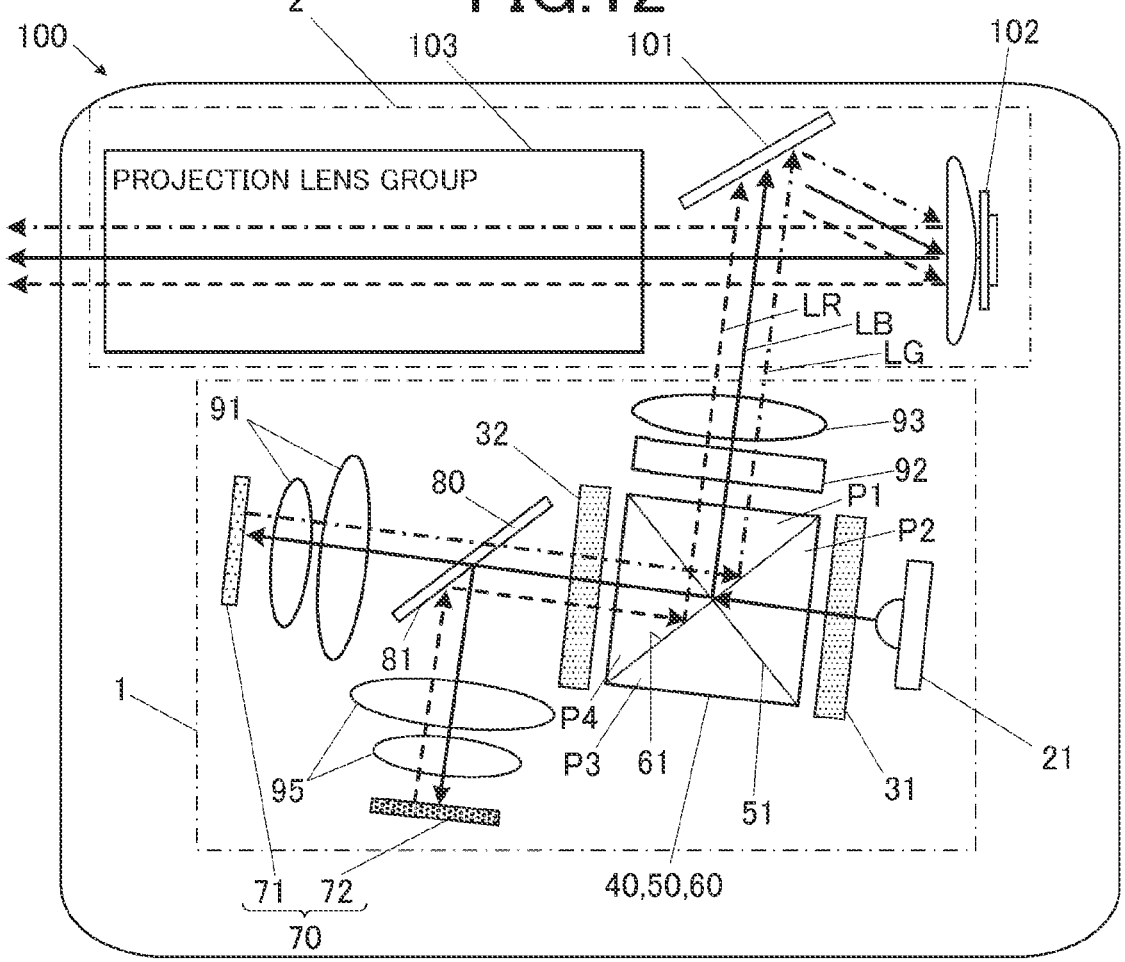
FIG. 12 is a schematic diagram illustrating a configuration of a projector having a light source device according to the third embodiment.
FIG. 13 is a diagram illustrating a state of the light source device of the third embodiment in the frame period when red light, green light, and blue light are each emitted.

FIG. 12 is a schematic diagram illustrating the configuration of the projector 100 having the light source device 1 according to the third embodiment.

The fluorescent emitter 70 of the third embodiment does not have the phosphor wheel 73 or the rotation driver 75, but has the first phosphor 71 and the second phosphor 72 that are fixed in different positions from each other.

Of these, the first phosphor 71 is located such that the blue light LB having passed through the first polarization converter 31 and the optical member 40 and traveling in the +Y direction is incident on the first phosphor 71. The surface of the first phosphor 71 on which the blue light LB is incident is perpendicular to the Y direction. The first phosphor 71 may be provided on a surface of a support member (not shown in the drawings) whose position is fixed.

On the optical path of the p-polarized blue light LB from the first optical surface 51 to the first phosphor 71, there is a second polarization beam splitter 80 having a third optical surface 81 that separates the incident blue light LB into light beams of different polarization directions from each other. The second polarization beam splitter 80 is a third optical thin layer (not shown in the drawings) that functions as a polarization beam splitter formed by vapor deposition or the like on one side (third optical surface 81) of a transparent substrate. However, the second polarization beam splitter 80 is not limited to this, and may be a third optical thin layer formed on one surface of the prism in the same manner as the first polarization beam splitter 50. The third optical surface 81 is parallel to the Z direction and the cross-section of the third optical surface 81 parallel to the XY plane is inclined at an angle of +135° (−45°) to the X axis. Thus, the third optical surface 81 is parallel to the second optical surface 61. The third optical surface 81 of the second polarization beam splitter 80 transmits the p-polarized blue light LB and reflects the s-polarized blue light LB.

The third optical surface 81 functions as a mirror (dichroic mirror) having wavelength-dependent reflectance (transmittance) for the wavelength range of green light LG and red light LR. In detail, the third optical surface 81 transmits the green light LG of the green wavelength range and reflects the red light LR of the red wavelength range.

On the optical path of the p-polarized blue light LB from the first optical surface 51 to the third optical surface 81, there is provided a second polarization converter 32. The second polarization converter 32 in this embodiment is a liquid crystal element just like the first polarization converter 31. The second polarization converter 32 switches the polarization state of the blue light LB incident on the third optical surface 81 between the p-polarized light and the s-polarized light. The CPU 11 controls the switching of the polarization by the second polarization converter 32. Therefore, the CPU 11 functions as the first controller that controls the first polarization converter 31 and the second controller that controls the second polarization converter 32.

The p-polarized light passes through the second polarization converter 32, travels in the +Y direction, passes through the third optical surface 81, and is guided to the first phosphor 71 by the third optical surface 81. The s-polarized light passes through the second polarization converter 32, travels in the +Y direction, is reflected in the −X direction by the third optical surface 81, and is guided to the second phosphor 72. In other words, the second phosphor 72 is provided on the optical path of the s-polarized light that has been reflected in the −X direction by the third optical surface 81. The surface of the second phosphor 72 on which the blue light LB is incident is perpendicular to the X direction. The second phosphor 72 may be provided on a surface of a support member (not shown in the drawings) whose position is fixed. The lens group 91 that focuses the blue light LB travelling to the first phosphor 71 is provided between the second polarization beam splitter 80 and the first phosphor 71. A lens group 95 that focuses the blue light LB travelling to the second phosphor 72 is provided between the second polarization beam splitter 80 and the second phosphor 72.

FIG. 13 illustrates the state of the light source device 1 of the third embodiment in the frame period when the red light LR, the green light LG, and the blue light LB are each output.

In any of the frame periods Fr, Fg, and Fb in the third embodiment, the first light source 21 is in a state ("ON") of emitting the blue light LB.

Figure 14:
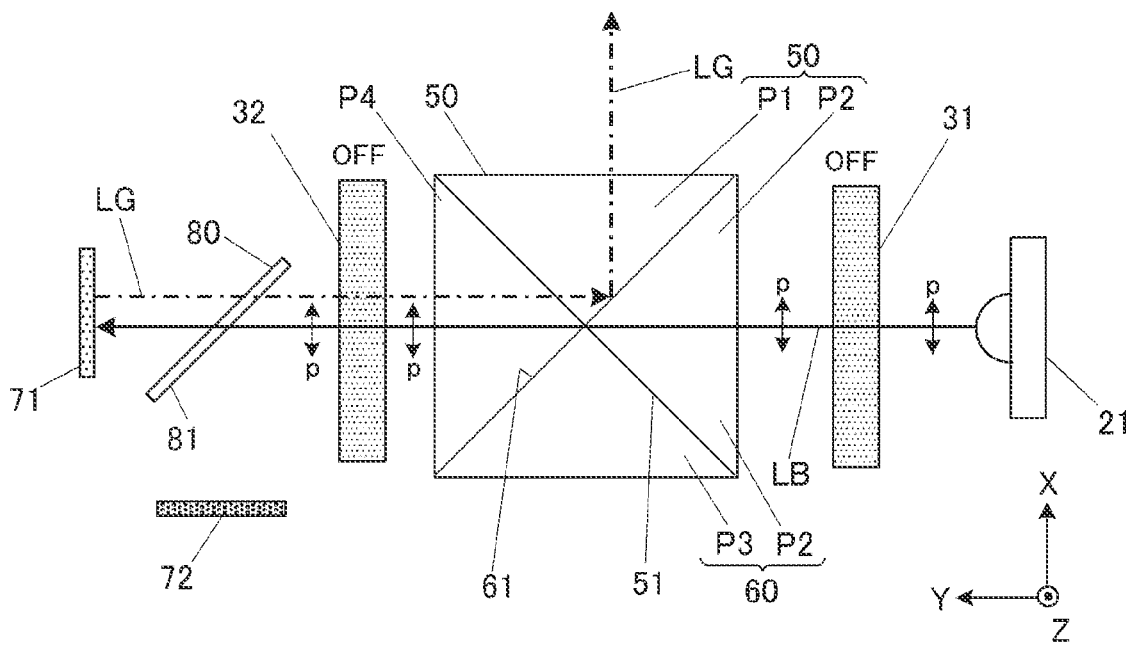
FIG. 14 is a diagram illustrating an operation of the light source device in the frame period when the green light is output.

FIG. 14 illustrates the operation of the light source device 1 in the frame period Fg when the green light LG is output.

Figure 15:
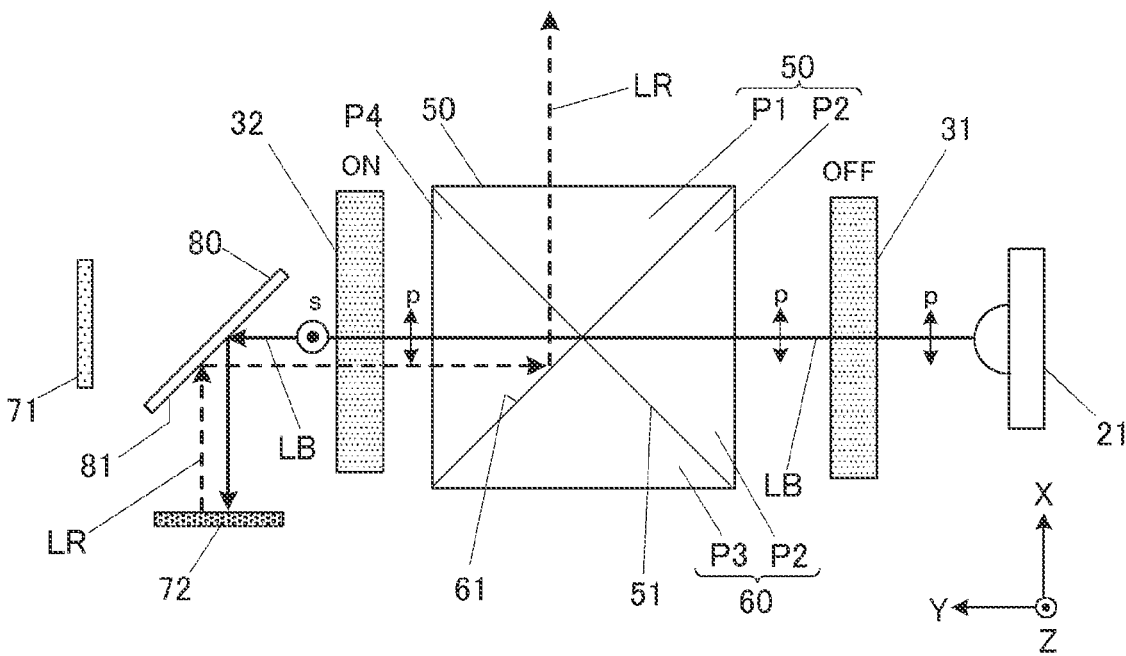
FIG. 15 is a diagram illustrating an operation of the light source device in the frame period when the red light is output.

FIG. 15 illustrates the operation of the light source device 1 in the frame period Fr when the red light LR is output.

In FIG. 14 and FIG. 15, the lens groups 91, 95, the MLA 92, and the lens 93 are omitted.

As illustrated in FIG. 13, in the frame period Fb when the blue light LB is output, the first polarization converter 31 is turned on under the control by the CPU 11. The second polarization converter 32 may be either in the ON state or in the OFF state, however, of the ON state and the OFF state, the second polarization converter 32 is preferably in the state where the driving voltage to the liquid crystal element is smaller from the viewpoint of reducing power consumption. Because the optical path of blue light LB in frame period Fb is the same as that in the first embodiment, the explanation is omitted.

As illustrated in FIG. 13, in the frame period Fg when the green light LG is output, under control by the CPU 11, the first polarization converter 31 and the second polarization converter 32 are both in the OFF state. As a result, as illustrated in FIG. 14, the p-polarized blue light LB emitted by the first light source 21 and travelling in the +Y direction passes through the first polarization converter 31, the first optical surface 51 of the first polarization beam splitter 50, the second optical surface 61 of the dichroic mirror 60, and the second polarization converter 32, and is incident on the third optical surface 81 of the second polarization beam splitter 80 while it is still p-polarized. The p-polarized blue light LB that is incident on the third optical surface 81 passes through the third optical surface 81 and is guided to the first phosphor 71. The first phosphor 71 emits the green light LG in response to the incident blue light LB. This green light LG travelling in the direction having a component along the −Y direction passes through the third optical surface 81 of the second polarization beam splitter 80 and the second polarization converter 32, is incident on the second optical surface 61 of the dichroic mirror 60, and is reflected in the direction having a component along the +X direction. This green light LG is output from the light source device 1 and enters the image projector 2.

As illustrated in FIG. 13, in the frame period Fr when the red light LR is output, the first polarization converter 31 is in the OFF state and the second polarization converter 32 is in the ON state under control by the CPU 11. Thus, as illustrated in FIG. 15, the p-polarized blue light LB emitted by the first light source 21 and traveling in the +Y direction passes through the first polarization converter 31, the first optical surface 51 of the first polarization beam splitter 50, and the second optical surface 61 of the dichroic mirror 60, and is converted to s-polarized light by the second polarization converter 32. This s-polarized blue light LB is reflected in the −X direction by the third optical surface 81 of the second polarization beam splitter 80 and is incident on the second phosphor 72. The second phosphor 72 emits red light LR in response to the incident blue light LB. This red light LR travels in the direction having a component along the +X direction, is reflected in the direction having a component along the −Y direction by the third optical surface 81 of the second polarization beam splitter 80, passes through the second polarization converter 32, is incident on the second optical surface 61 of the dichroic mirror 60, and is reflected again in the direction having a component along the +X direction. This red light LR is output from light source device 1 and enters the image projector 2.

As described above, the light source device 1 of the third embodiment includes the second polarization beam splitter 80 and the second polarization converter 32. The second polarization beam splitter 80 is provided on the optical path of the p-polarized light guided by the first optical surface 51 and has the third optical surface 81 that separates the incident light into light beams having different polarization directions from each other. The second polarization converter 32 is provided on the optical path of the p-polarized light from the first optical surface 51 to the third optical surface 81. The CPU 11 (second controller) controls the second polarization converter 32 such that the blue light LB incident on the third optical surface 81 is switched between the s-polarized light and the p-polarized light. The p-polarized light from the second polarization converter 32 is incident on the third optical surface 81, and is guided to the first phosphor 71 by the third optical surface 81. The s-polarized light from the second polarization converter 32 is incident on the third optical surface 81 and is guided to the second phosphor 72 by the third optical surface 81. As a result, two colors of fluorescence (green light LG and red light LR) can be obtained and output without using the rotatable phosphor wheel 73. Therefore, operating noise, vibration, and dust due to the rotation of the phosphor wheel 73 can be reduced. In addition, because there are fewer operating parts, the light source device 1 can be simply configured and has improved resistance to external shocks.

MODIFIED EXAMPLES

Next, the modified examples 1 to 3 of the above embodiments are described. Any two or all of the modified examples 1 to 3 may be combined.

Modified Example 1

Figure 16:
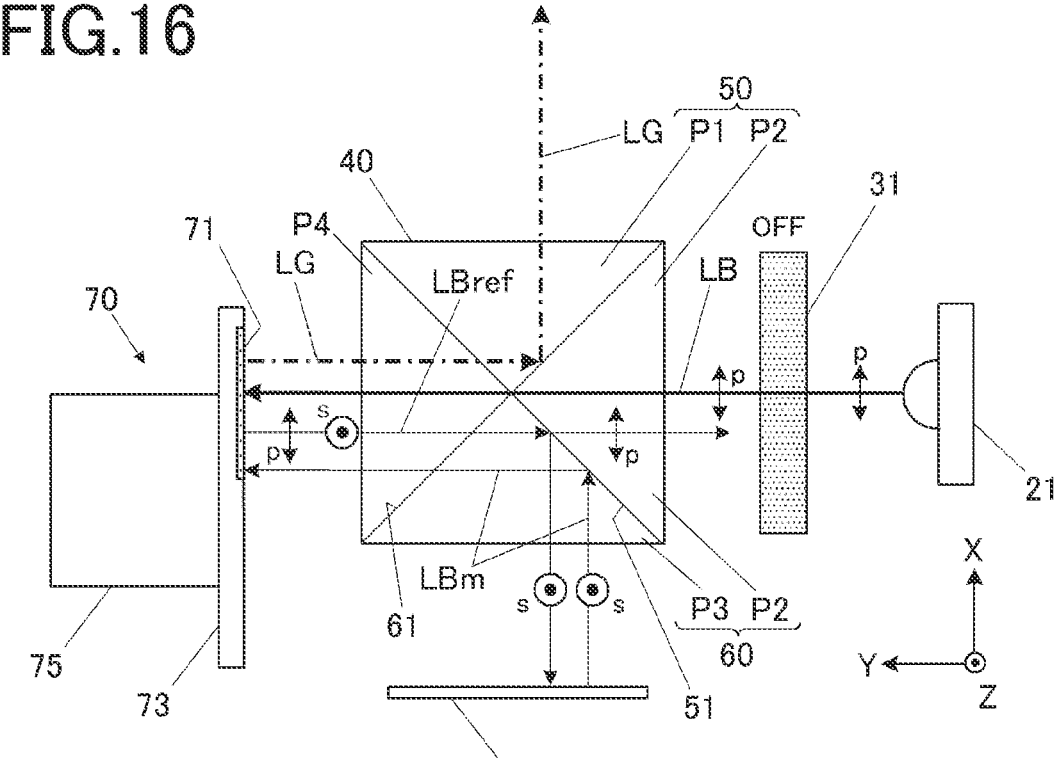
FIG. 16 is a diagram illustrating a configuration and operation of a light source device of the modified example 1.

FIG. 16 is a diagram illustrating the configuration and operation of the light source device 1 of the modified example 1.

The light source device 1 illustrated in FIG. 16 is similar to the light source device 1 of the first embodiment except that a mirror 96 is added. The mirror 96 is located such that a part (the s-polarized component) of the blue reflected light LBref reflected in the −X direction by the first optical surface 51 is incident on the mirror 96. The blue reflected light LBref is the blue light LB reflected by the fluorescent emitter 70. The mirror 96 is provided in a predetermined orientation such that the incident blue reflected light LBref is reflected by the mirror 96, is reflected by the first optical surface 51 again, and is incident on the fluorescent emitter 70 (the first phosphor 71 in the frame period Fg, and the second phosphor 72 in the frame period Fr) again. In the example illustrated in FIG. 16, the light-reflecting surface of the mirror 96 is perpendicular to the x-direction.

The modified example 1 may be combined with the second embodiment or the third embodiment.

According to the configuration of modified example 1, part of the blue light LB reflected by the fluorescent emitter 70 is incident on the fluorescent emitter 70 again and is used for excitation of fluorescence. Therefore, the generation efficiency of fluorescence can be enhanced.

Modified Example 2

The light source device 1 of modified example 2 is similar to that of the first embodiment except for the different positional relationships of the first light source 21, the optical member 40, and the fluorescent emitter 70.

Figure 17:
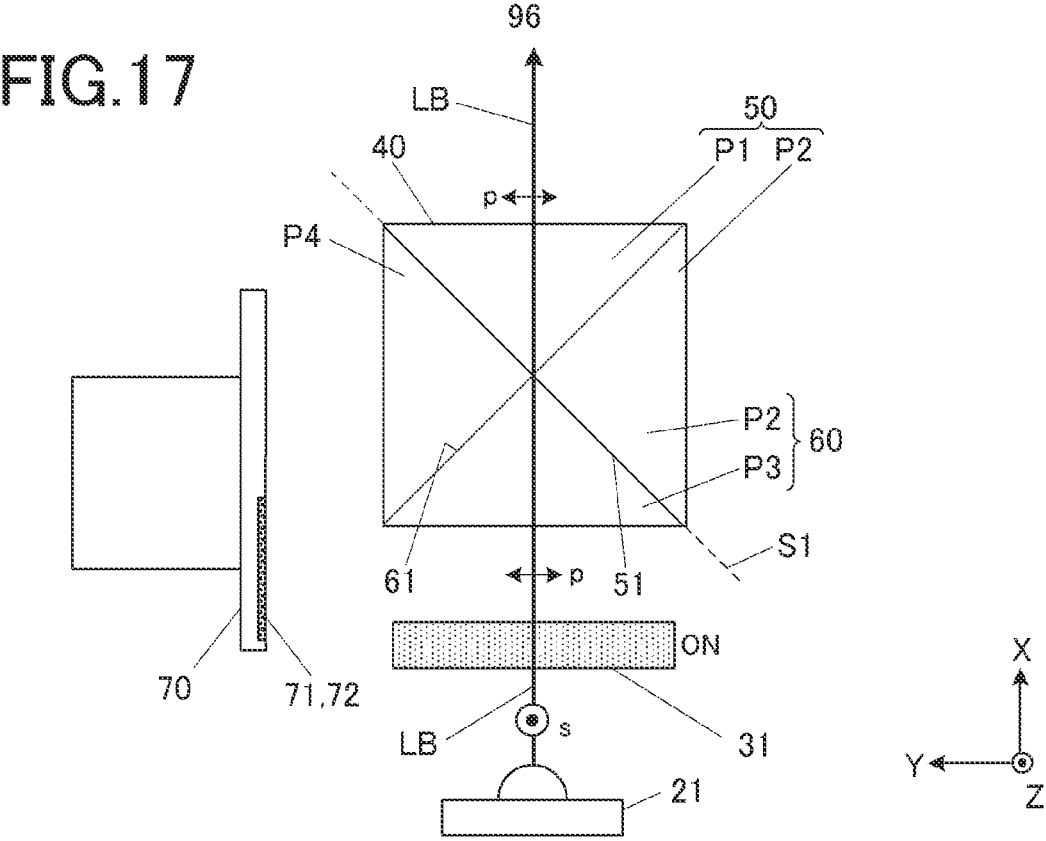
FIG. 17 is a diagram illustrating a configuration of a light source device of the modified example 2 and its operation in the frame period when the blue light is output.

FIG. 17 illustrates the configuration of light source device 1 of the modified example 2 and its operation in the frame period Fb when the blue light LB is output.

Figure 18:
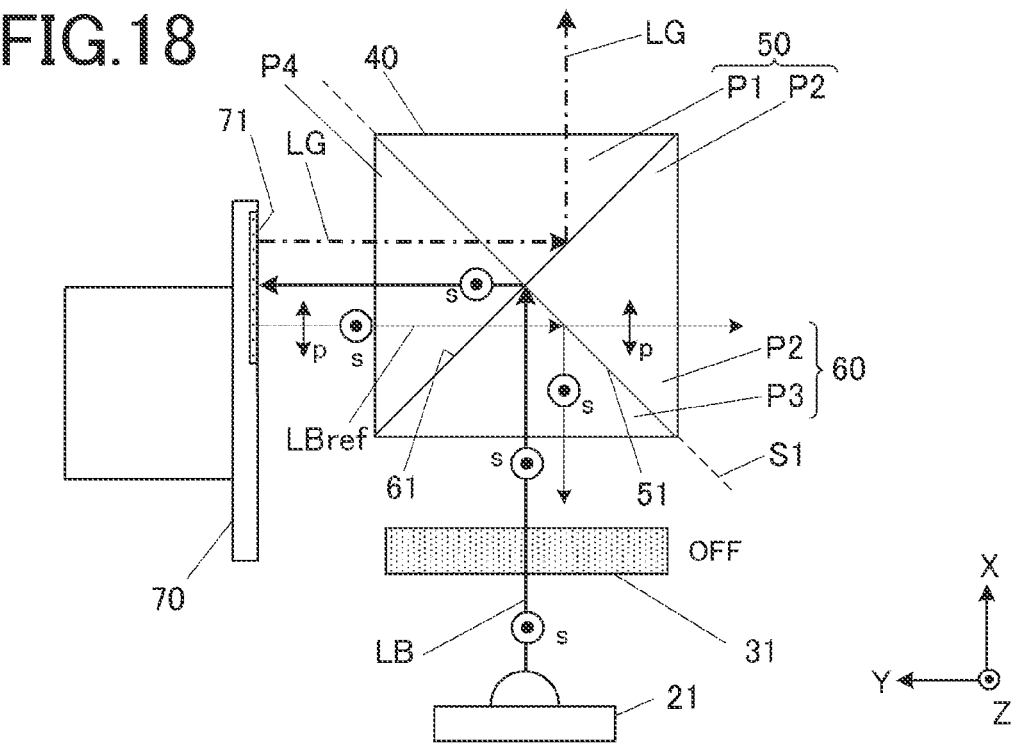
FIG. 18 is a diagram illustrating a configuration of the light source device of the modified example 2 and its operation in the frame period when the green light is output.

FIG. 18 illustrates the configuration of light source device 1 of the modified example 2 and its operation in the frame period Fg when the green light LG is output.

As illustrated in FIG. 17 and FIG. 18, in the light source device 1 of the modified example 2, the first light source 21 is provided at a position on the −X direction side of the optical member 40. The first light source 21 emits the s-polarized blue light LB in the +X direction. The first light source 21 and the fluorescent emitter 70 are located on the same side of the first virtual plane S1 as each other. The first virtual plane S1 includes the first optical surface 51 and extends parallel to the first optical surface 51.

As illustrated in FIG. 17, in the frame period Fb when the blue light LB is output, the first polarization converter 31 is in the ON state under control by the CPU 11. The s-polarized blue light LB emitted by the first light source 21 is converted to p-polarized light by the first polarization converter 31. This p-polarized light passes through the first optical surface 51 of the first polarization beam splitter 50 and the second optical surface 61 of the dichroic mirror 60, travels in the +X direction, is output from the light source device 1, and enters the image projector 2.

As illustrated in FIG. 18, in the frame period Fg when the green light LG is output, the first polarization converter 31 is in the OFF state under control by the CPU 11. As a result, the s-polarized blue light LB emitted by the first light source 21 passes through the first polarization converter 31 while it is still s-polarized. This s-polarized blue light LB is reflected in the +Y direction by the first optical surface 51 of the first polarization beam splitter 50 and is incident on the first phosphor 71 of the fluorescent emitter 70. The optical path of the green light LG emitted by the first phosphor 71 in response to the incident blue light LB is the same as that of the first embodiment illustrated in FIG. 8. The light path of the blue light LB (blue reflected light LBref) reflected by the first phosphor 71 is also the same as that of the first embodiment illustrated in FIG. 8. Therefore, even in the present modified example, the blue reflected light LBref travels in a different direction from the green light LG. Therefore, it is possible to reduce the occurrence of the problems that light of a desired color cannot be output due to mixing and blending of the green light LG and the blue light LB (blue reflected light LBref).

In the present modified example, the state and operation of the light source device 1 in the frame period Fr when the red light LR is output are the same as those of the light source device 1 in the frame period Fg, except that the blue light LB is incident on the second phosphor 72 of the phosphor wheel 73.

In the present modified example, the linearly polarized light guided to the fluorescent emitter 70 through the first optical surface 51 and immediately after reflected by the fluorescent emitter 70 is the s-polarized light. Therefore, in the present modified example, the s-polarized light corresponds to the "second linearly polarized light," and the p-polarized light corresponds to the "first linearly polarized light."

Although the first light source 21 emits the s-polarized light in the above description, the first light source 21 may emit the p-polarized light. In that case, the first polarization converter 31 is set to be in the OFF state in the frame period Fb when the blue light LB is output, and the first polarization converter 31 is set to be in the ON state in the frame periods Fg and Fr when the green light LG and the red light LR are respectively output.

The modified example 2 may be combined with the second embodiment or the third embodiment. When the modified example 2 is combined with the second embodiment, for example, the first optical surface 51 may have a function of reflecting the red light LR, and the second light source 22 may be placed on the −Y side of the first optical surface 51. As a result, the red light LR emitted by the second light source 22 and traveling in the +Y direction can be reflected in the +X direction and output.

As described above, the first light source 21 and the fluorescent emitter 70 in the modified example 2 are located on the same side of the first virtual plane S1, which includes the first optical surface 51 and extends parallel to the first optical surface 51. The p-polarized light (first linearly polarized light) of the blue light LB passes through the first optical surface 51 and is guided in the +X direction. The s-polarized light (second linearly polarized light) of the blue light LB is reflected by the first optical surface 51 and is guided in the +Y direction. As a result, the light source device 1 having a compact configuration can be realized.

Modified Example 3

Figure 19:
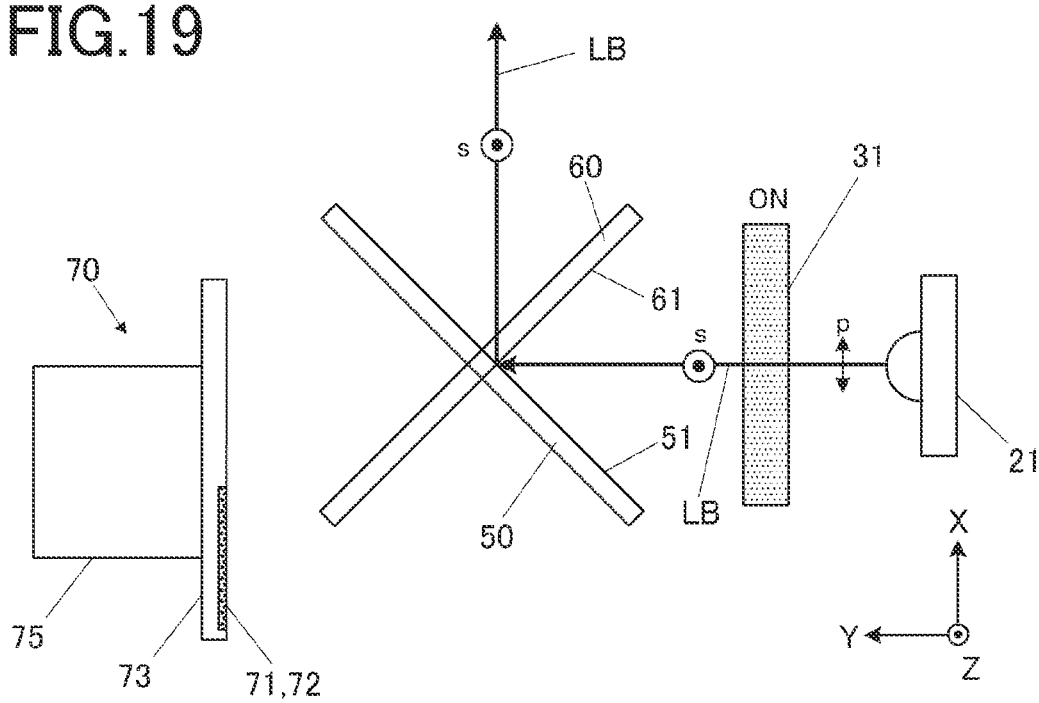
FIG. 19 is a diagram illustrating a configuration and operation of a light source device of the modified example 3.

FIG. 19 illustrates the configuration and operation of the light source device 1 of the modified example 3.

The light source device 1 illustrated in FIG. 19 is the same as that of the first embodiment, except that the first polarization beam splitter 50 and the dichroic mirror 60 are plate-shaped. The plate-shaped first polarization beam splitter 50 is a first optical thin layer that functions as a polarization beam splitter formed by vapor deposition or the like on one side (first optical surface 51) of a transparent substrate. The plate-shaped dichroic mirror 60 is a second optical thin layer that functions as a mirror having wavelength-dependent reflectance (transmittance) formed by vapor deposition or the like on one side (second optical surface 61) of a transparent substrate. The plate-shaped first polarization beam splitter 50 and the dichroic mirror 60 are arranged such that the first optical surface 51 and the second optical surface 61 intersect each other perpendicularly. Thus, an optical member having the same function as the optical member 40 of the above embodiment can be obtained.

The modified example 3 may be combined with the second embodiment or the third embodiment.

Modified Example 4

In the first to third embodiments and modified examples 1 to 3 described above, the first polarization converter 31 switches the polarization direction of the linearly polarized light emitted by the first light source 21, thereby switching the blue light LB incident on the first optical surface 51 between p-polarized light and s-polarized light. Instead of this configuration, in the present modified example, the first polarization converter 31 is omitted, and the first light source 21 emits the s-polarized light and the p-polarized light such that the incident periods on the first optical surface 51 are complementary. In detail, the first light source 21 includes a p-polarized sub light source that emits the p-polarized light and an s-polarized sub light source that emits the s-polarized light. The s-polarized light from the s-polarized sub light source and the p-polarized light from the p-polarized sub light source are incident on the first optical surface 51 so that the incident periods to the first optical surface 51 are complementary. As a result, the polarization direction of the blue light LB incident on the first optical surface 51 can be switched without using the first polarization converter 31.

The p-polarized sub light source can be of the same configuration as the first light source 21 of the first embodiment. The s-polarized sub light source can be, for example, the p-polarized sub light source rotated about 90° around the optical axis of the emitted light.

The first light source 21 has an optical system that guides the blue light LB emitted by the s-polarized sub light source and the p-polarized sub light source into one common optical path. The configuration of the optical system is not particularly limited, but can be, for example, configured with a polarization beam splitter that reflects the s-polarized light emitted by the s-polarized sub light source and guides it to the first optical surface 51, and transmits the p-polarized light emitted by the p-polarized sub light source and guides it to the first optical surface 51.

The method in which the first light source 21 causes the p-polarized light from the p-polarized sub light source and the s-polarized light from the s-polarized sub light source to incident on the first optical surface 51 such that the incident periods on the first optical surface 51 are complementary includes, for example, stopping the emission by the s-polarized sub light source in the emission period of the p-polarized sub light source, and stopping the emission by the p-polarized sub light source in the emission period of the s-polarized sub light source. Alternatively, while both the p-polarized sub light source and the s-polarized sub light source are emitting light, only the p-polarized light from the p-polarized sub light source is blocked in a certain period, and only the s-polarized light from the s-polarized sub light source is blocked in a period excluding the above certain period.

[Others]

The descriptions in the above embodiments are examples of the light source device and projection device of the present invention and do not limit the present invention.

For example, the light source device 1 may be incorporated into a device other than the projector 100 (projection device).

The colors of light output by the light source device 1 are not limited to blue, green and red. The number of colors of light output by the light source device 1 is not limited to three, but may be two, or four or more. In other words, the light source device 1 only needs to output light of at least two different colors.

Although the first light source 21 outputs the linearly polarized light in the above example, the present invention is not limited to this configuration. The light emitted by the light source may pass through a polarization selector such as a polarizing plate such that linearly polarized light is extracted.

The light source device 1 may further include an optical system, not shown in the drawings, that guides the light emitted by the first light source 21 and/or the second light source 22 to the first optical surface 51. For example, the light emitted by the first light source 21 and/or the second light source 22 may be configured to be incident on the first optical surface 51 after being reflected one or more times by a mirror or the like. Also, for example, the blue light LB from the first light source 21 provided outside the projector 100 may be guided via an optical fiber to be incident on the first optical surface 51.

The detailed configuration and detailed operation of each component of the light source device 1 and the projector 100 in the above embodiment can, of course, be changed as appropriate to the extent not to depart from the purpose of the present invention.

Although some embodiments of the present invention have been described and illustrated in detail, the disclosed embodiments are made for purposes of not limitation but illustration and example only. The scope of the present invention should be interpreted by terms of the appended claims.

The invention claimed is:

1. A light source device comprising:
   a first polarization beam splitter that has a first optical surface that separates light incident on the first optical surface into light beams having different polarization directions from each other;
   a dichroic mirror that has a second optical surface, the second optical surface intersecting the first optical surface and guiding reflection light reflected by a fluorescent emitter and fluorescence in different directions from each other, the reflection light being part of incident light that has been emitted by a first light source and incident on the fluorescent emitter via the first optical surface, the fluorescence being emitted by the fluorescent emitter in response to the incident light,
   wherein the first optical surface guides first linearly polarized light in a first direction, the first linearly polarized light being part of first light of a first wavelength range that has been emitted by the first light source and incident on the first optical surface,
   wherein the first optical surface guides second linearly polarized light in a second direction to the fluorescent emitter, the second linearly polarized light being part of the first light and having a polarization direction perpendicular to a polarization direction of the first linearly polarized light, the second direction being different from the first direction,
   wherein the second optical surface guides at least part of the fluorescence emitted by the fluorescent emitter in response to incidence of the first light on the fluorescent emitter to the first direction, and
   wherein the second optical surface guides part of the first light reflected by the fluorescent emitter to a direction that is different from the first direction;
   the light source device further comprising:
   a first polarization converter that is provided on an optical path of the first light from the first light source to the first optical surface; and
   a first controller that controls the first polarization converter such that the first light to be incident on the first optical surface is switched between the first linearly polarized light and the second linearly polarized light.

2. A light source device comprising:
   a first polarization beam splitter that has a first optical surface that separates light incident on the first optical surface into light beams having different polarization directions from each other;
   a dichroic mirror that has a second optical surface, the second optical surface intersecting the first optical surface and guiding reflection light reflected by a fluorescent emitter and fluorescence in different directions from each other, the reflection light being part of incident light that has been emitted by a first light source and incident on the fluorescent emitter via the first optical surface, the fluorescence being emitted by the fluorescent emitter in response to the incident light;
   wherein the first optical surface guides first linearly polarized light in a first direction, the first linearly polarized light being part of first light of a first wavelength range that has been emitted by the first light source and incident on the first optical surface,
   wherein the first optical surface guides second linearly polarized light in a second direction to the fluorescent emitter, the second linearly polarized light being part of the first light and having a polarization direction perpendicular to a polarization direction of the first linearly polarized light, the second direction being different from the first direction, wherein the second optical surface guides at least part of the fluorescence emitted by the fluorescent emitter in response to incidence of the first light on the fluorescent emitter to the first direction, wherein the second optical surface guides part of the first light reflected by the fluorescent emitter to a direction that is different from the first direction;

wherein the fluorescent emitter includes:
- a first phosphor that emits second light of a second wavelength range in response to incidence of the first light, the second wavelength range being different from the first wavelength range; and
- a second phosphor that emits third light of a third wavelength range in response to incidence of the first light, the third wavelength range being different from the first wavelength range and the second wavelength range, and wherein the second optical surface guides the second light emitted by the first phosphor and the third light emitted by the second phosphor in the first direction; and a second polarization beam splitter that is provided on an optical path of the second linearly polarized light having been guided by the first optical surface and that has a third optical surface that separates light incident on the third optical surface into light beams having different polarization directions from each other;

a second polarization converter that is provided on an optical path of the second linearly polarized light from the first optical surface to the third optical surface; and a second controller that controls the second polarization converter such that light to be incident on the third optical surface is switched between the first linearly polarized light and the second linearly polarized light, wherein the third optical surface guides the second linearly polarized light from the second polarization converter to one of the first phosphor and the second phosphor, and wherein the third optical surface guides the first linearly polarized light from the second polarization converter to another of the first phosphor and the second phosphor.

3. The light source device according to claim 1,
wherein the fluorescent emitter includes:
- a first phosphor that emits second light of a second wavelength range in response to incidence of the first light, the second wavelength range being different from the first wavelength range; and
- a second phosphor that emits third light of a third wavelength range in response to incidence of the first light, the third wavelength range being different from the first wavelength range and the second wavelength range, and
- wherein the second optical surface guides the second light emitted by the first phosphor and the third light emitted by the second phosphor in the first direction.

4. The light source device according to claim 3,
wherein the fluorescent emitter includes a rotator having the first phosphor and the second phosphor,
wherein, in response to incidence of the first light on the first phosphor upon rotation of the rotator, the first phosphor emits the second light, and wherein, in response to incidence of the first light on the second phosphor upon rotation of the rotator, the second phosphor emits the third light.

5. The light source device according to claim 2, further comprising:
- a first polarization converter that is provided on an optical path of the first light from the first light source to the first optical surface; and
- a first controller that controls the first polarization converter such that the first light to be incident on the first optical surface is switched between the first linearly polarized light and the second linearly polarized light.

6. The light source device according to claim 3, further comprising:
- a second polarization beam splitter that is provided on an optical path of the second linearly polarized light having been guided by the first optical surface and that has a third optical surface that separates light incident on the third optical surface into light beams having different polarization directions from each other;
- a second polarization converter that is provided on an optical path of the second linearly polarized light from the first optical surface to the third optical surface; and
- a second controller that controls the second polarization converter such that light to be incident on the third optical surface is switched between the first linearly polarized light and the second linearly polarized light,
- wherein the third optical surface guides the second linearly polarized light from the second polarization converter to one of the first phosphor and the second phosphor, and
- wherein the third optical surface guides the first linearly polarized light from the second polarization converter to another of the first phosphor and the second phosphor.

7. The light source device according to claim 1,
wherein the first light source and the fluorescent emitter are located on opposite sides of a first virtual plane, the first virtual plane including the first optical surface and extending parallel to the first optical surface,
wherein the first optical surface reflects the first linearly polarized light of the first light and guides the first linearly polarized light in the first direction, and
wherein the first optical surface transmits the second linearly polarized light of the first light and guides the second linearly polarized light in the second direction.

8. The light source device according to claim 1,
wherein the first light source and the fluorescent emitter are located on the same side of a first virtual plane, the first virtual plane including the first optical surface and extending parallel to the first optical surface,
wherein the first optical surface transmits the first linearly polarized light of the first light and guides the first linearly polarized light in the first direction, and
wherein the first optical surface reflects the second linearly polarized light of the first light and guides the second linearly polarized light in the second direction.

9. The light source device according to claim 1, further comprising:
- a second light source that emits fourth light of a third wavelength range,
- wherein the fluorescent emitter emits second light of a second wavelength range in response to incidence of the first light,
- wherein the first wavelength range, the second wavelength range, and the third wavelength range are different from one another, and wherein the second optical surface guides the second light emitted by the fluorescent emitter and the fourth light emitted by the second light source in the first direction.

10. The light source device according to claim 2, further comprising:
a second light source that emits fourth light of a third wavelength range,
wherein the fluorescent emitter emits second light of a second wavelength range in response to incidence of the first light,
wherein the first wavelength range, the second wavelength range, and the third wavelength range are different from one another, and
wherein the second optical surface guides the second light emitted by the fluorescent emitter and the fourth light emitted by the second light source in the first direction.

11. The light source device according to claim 9,
wherein the first light source, the second light source, and the fluorescent emitter are provided in different spaces from one another among four spaces that are segmented by a first virtual plane and a second virtual plane, the first virtual plane including the first optical surface and extending parallel to the first optical surface, the second virtual plane including the second optical surface and extending parallel to the second optical surface.

12. The light source device according to claim 10,
wherein the first light source, the second light source, and the fluorescent emitter are provided in different spaces from one another among four spaces that are segmented by a first virtual plane and a second virtual plane, the first virtual plane including the first optical surface and extending parallel to the first optical surface, the second virtual plane including the second optical surface and extending parallel to the second optical surface.

13. The light source device according to claim 1, further comprising:
a mirror on which part of the first light is incident, the part of the first light having been reflected by the fluorescent emitter and having been guided by the first optical surface,
wherein the first light having been incident on and reflected by the mirror in a predetermined orientation is incident on the fluorescent emitter again via the first optical surface.

14. The light source device according to claim 1,
wherein the second optical surface is perpendicular to the first optical surface.

15. A projection device comprising:
a light source device according to claim 1; and
an image projector that projects an image using light output by the light source device.

16. A projection device comprising:
a light source device according to claim 2; and
an image projector that projects an image using light output by the light source device.

* * * * *